(12) United States Patent
Wakefield

(10) Patent No.: US 8,121,979 B2
(45) Date of Patent: Feb. 21, 2012

(54) SYSTEM AND METHOD FOR REPLICATION AND SYNCHRONISATION

(75) Inventor: Kevin Wakefield, Bristol (GB)

(73) Assignee: Nokia Siemens Networks Oy, Espoo (FI)

( * ) Notice: Subject to any disclaimer, the term of this patent is extended or adjusted under 35 U.S.C. 154(b) by 175 days.

(21) Appl. No.: 12/679,942

(22) PCT Filed: Sep. 26, 2008

(86) PCT No.: PCT/EP2008/062957
§ 371 (c)(1),
(2), (4) Date: May 5, 2010

(87) PCT Pub. No.: WO2009/040425
PCT Pub. Date: Apr. 2, 2009

(65) Prior Publication Data
US 2010/0223232 A1  Sep. 2, 2010

(51) Int. Cl.
*G06F 17/30* (2006.01)
(52) U.S. Cl. ......................................... 707/634
(58) Field of Classification Search ................... 707/634
See application file for complete search history.

(56) References Cited

U.S. PATENT DOCUMENTS

| | | | |
|---|---|---|---|
| 6,301,589 B1 | 10/2001 | Hirashima et al. | |
| 7,702,667 B2* | 4/2010 | Yahalom et al. | 707/611 |
| 8,010,498 B2* | 8/2011 | Gounares et al. | 707/665 |
| 2004/0117666 A1 | 6/2004 | Lavender et al. | |
| 2006/0230076 A1* | 10/2006 | Gounares et al. | 707/200 |
| 2007/0088763 A1* | 4/2007 | Yahalom et al. | 707/201 |

OTHER PUBLICATIONS

"Information technology—Open Systems Interconnection—The Directory: Replication; X.525 (Aug. 2005)" ITU-T Standard in Force (I), International Telecommunication Union, Geneva, CH, No. X.525 (Aug. 2005), Aug. 29, 2005, XP017405103.
John Merrells Sleepy Cat Software et al: "LDAP Replication Architecture; draft-i etf-1dup-model-09.txt" IETF Standard-Working-Draft, Internet Engineering Task Force, IETF, CH, vol. ldup, No. 9, Oct. 1, 2003, XP015022321, ISSN: 0000-0004.
Oracle: "Oracle Internet Directory: Administrator?s Guide. Release 2.0.6" [Online] Dec. 1, 1999, Internet, p. 1-440, XP002481701 Retrieved from the Internet: URL : www.comp.hkbu.edu.hk/docs/o/oracle8i/network.816/a77230.pdf> [retrieved on Dec. 1, 1999].
Richard V Huber Gerald F Maziarski AT&T Laboratories Ryan D Moats Lemur Networks Jun. 2003: "General Usage Profile for LDAPv3 Replication draft-i etf-1dup-usage-profi 1e-05.txt; draft-ietf-1dup-usage-profile-05.t" IETF Standard-Working-Draft, Internet Engineering Task Force, IETF, CH, vol. ldup, No. 5, Jun. 1, 2003, XP015002549, ISSN: 0000-0004.
International Telecommunication Union, Geneva CH, Dec. 1, 1997, Dec. 12, 1997 XP040317493.

(Continued)

*Primary Examiner* — Sheree Brown
(74) *Attorney, Agent, or Firm* — Harrington & Smith

(57) ABSTRACT

Embodiments of the invention provide a replication and synchronization mechanism that is peer to peer and multi-threaded. Embodiments of the invention may further enable a useable alternative service in the event of a loss of communications between replicas and a fully automated recovery upon the recovery of communications between the replicas. A replication and synchronization mechanism may further provide entry level synchronization and support for transactions. The replication and synchronization mechanism merges changes that have been made independently as a result of the loss of communication between peers.

41 Claims, 11 Drawing Sheets

OTHER PUBLICATIONS

Mandatory LDAP Replica Management Ryan Moats Lemur Networks et al: "Mandatory LDAP Replica Management; draft-ietf-ldup-mrm-01.txt" Feb. 1, 2002, IETF Standard-Working-Draft. Internet Engineering Task Force, IETF, CH , XP015022323 ISSN: 0000-0004.

Albert Langer Directory Designs: "LDUP Multiple Draft Conflict Resolution (MDCR); draft-1anger-1dup-mdcr-00.txt" IETF Standard-Working-Draft, Internet Engineering Task Force. IETF, CH, Apr. 7, 2000, XP015031361, ISSN: 0000-0004.

* cited by examiner

SYSTEM AND METHOD FOR REPLICATION AND SYNCHRONISATION

RELATED APPLICATIONS

This application is related to U.S. patent application Ser. No. 11/783,537, filed on Apr. 10, 2007, entitled "Improved Data Access In Distributed Server Systems," naming Kevin Wakefield as inventor; U.S. patent application Ser. No. 11/783,539, filed on Apr. 10, 2007, entitled "Improved Sub-Tree Access Control In Network Architectures," naming Kevin Wakefield as inventor; U.S. patent application Ser. No. 11/783,586, filed on Apr. 10, 2007, entitled "Alias Hiding In Network Data Repositories," naming Kevin Wakefield as inventor; U.S. patent application Ser. No. 11/783,585, filed on Apr. 10, 2007, entitled "Variant Entries In Network Data Repositories," naming Kevin Wakefield as inventor; U.S. patent application Ser. No. 11/783,553, filed on Apr. 10, 2007, entitled "Adaptation In Network Data Repositories," naming Kevin Wakefield as inventor; U.S. patent application Ser. No. 11/783,550, filed on Apr. 10, 2007, entitled "Nomadic Subscriber Data System," naming William M. Bondy as inventor; U.S. patent application Ser. No. 11/783,549, filed on Apr. 10, 2007, entitled "Improved Journaling In Network Data Architectures," naming Kevin Wakefield as inventor; U.S. patent application Ser. No. 60/907,594, filed on Apr. 10, 2007, entitled "Improved Data Access In Home Subscriber Servers," naming Phil Davies, Graham North, Ian Lucas, and Mili Verma as inventors; U.S. patent application Ser. No. 11/783,588, filed on Apr. 10, 2007, entitled "Indirect Methods In Network Data Repositories," naming Nick Prudden as inventor; and U.S. patent application Ser. No. 11/783,541, filed on Apr. 10, 2007, entitled "Improved Timing Device and Method," naming Nick Prudden as inventor. The contents of these applications are incorporated herein by reference in their entirety for all purposes.

FIELD

Embodiments of the invention relate to systems and methods for providing a replication and synchronization mechanism in a network data server. More particularly, an embodiment of the invention relates to systems and methods that enable robust, high speed data access for use in a communications network having a large number of subscribers whose respective data may be deployed in a centralized data repository for access by various applications operating within the network.

BACKGROUND

Replication and synchronization mechanisms in the prior art have a number of limitations. These limitations include single threaded and single process mechanisms. One server in a Directory System Agent (DSA) typically acts as a primary or master for all the updates to that DSA, regardless of how many other servers are involved or how great the communication distances. The loss of a single message is typically construed as a loss of synchronization. An automated promotion mechanism (to primary) is required to allow a second server to assume the responsibilities of the primary in the event that the existing primary fails. Without such a mechanism, there may be significant periods of time during which no updates are possible. However, from an individual server's point of view, the loss of communications to the primary server may be indistinguishable from the failure of that primary. Without further "god's eye view" information, a server may either decide to promote itself to primary when the original primary is still in operation (resulting in dual independent primaries), or decide not to promote itself when in fact the original primary has failed (resulting in no primaries). The recovery from having dual primaries may require a manual procedure and is liable to temporary and even permanent data loss.

SUMMARY OF THE INVENTION

Embodiments of the invention provide a replication and synchronization mechanism for a network data repository that is peer to peer and multi-threaded. Embodiments of the invention may further enable a useable alternative service in the event of a loss of communications between replicas hosting the network data repository and provide a fully automated recovery upon the recovery of communications between the replicas. The replicas are hosted on computers (e.g., servers), and in some embodiments more than one replica may be hosted on a computer. Embodiments of the replication and synchronization mechanism may further provide robust processing for the network database in flaky (lossy) networks. The replication and synchronization mechanism may further provide entry level synchronization and support for transactions, according to an embodiment of the invention.

Embodiments of the invention provide a system for real-time data management of a network data repository in a peer-to-peer network. The system comprises a first replica of a plurality of replicas that is hosted in a first server computer. The first replica is configured to accept data updates to replica entries on the first replica, each replica entry corresponding to an entry in the network data repository. The first replica is also configured to update replica entries to include the accepted data updates. The first replica is further configured to determine states for replication agreements between the first replica and replicas of the plurality of replicas having corresponding replica entries to entries in the network data repository, wherein the first replica has a replication agreement with each replica of the plurality of replicas, each replication agreement pertaining to coordination of replica entries between replicas party to the agreement. The first replica may also determine if an updated replica entry on the first replica violates a replication agreement, wherein violation of the replication agreement indicates that an accepted data update on the first replica failed to be copied to another replica party to the replication agreement. The first replica may replicate accepted data updates to other replicas of the plurality of replicas for replication agreements having an active state and not violated for the accepted data update. Embodiments of the invention may include other replicas configured similar to the first replica descried above.

Embodiments of the invention also provide a method for real-time data management of a network data repository in a peer-to-peer computing network. The method comprises accepting a data update to an entry of the network data repository in a first replica of a plurality of replicas, the first replica hosted on a first server of a plurality of servers, the first replica containing at least a portion of the network data repository as a plurality of replica entries that correspond to entries in the network data repository. The method further calls for identifying a replica entry of the plurality of replicas on the first replica that corresponds to the entry. The method also comprises reviewing replication agreements between the first replica and other replicas of the plurality of replicas, wherein each replication agreement describes a relationship between the first replica and another replica of the plurality of replicas. The method also comprises determining a state of a first replication agreement between the first replica and a second replica of the plurality of replicas, the second replica hosted on a second server of the plurality of servers. The method comprises updating the identified replica entry on the first replica. The method further calls for replicating the accepted data update on the second replica if the first replication agreement is in an active state and if the accepted data update could be copied to the second replica.

An embodiment of the invention provides a system for managing data in a network data repository deployed across a plurality of servers. A first replica is configured for communications with other replicas of the plurality of replicas and hosted on a server of the plurality of servers. A first replicated information base on the first replica is configured to contain at least a portion of the network data repository, the first replicated information base comprising a plurality of replica entries such that each replica entry corresponds to an entry in the network data repository. A transaction module is configured to receive data updates to replica entries in the first replicated information base. A first add-delta module is configured to create a first entry delta for the first replica entry of the plurality of replica entries in the first replicated information base and provide the first entry delta with the received data update from the transaction module and create a copy of the received data update for a second replica entry in a second replica of the plurality of replicas. A first lock module is configured to lock the first replica entry in the first replicated information base. A first delta-OK module is configured to validate that the first entry delta has compatible characteristics with the first data replica entry, wherein the first add-delta module is further configured to transmit the copy of the received data update across the network to the second replica having the second data replica entry after the first delta-OK module has validated the first entry delta. A commit module is configured to request application of entry deltas after receiving success indicators from locking modules associated with a change to an entry in the network data repository. A first application module is configured to apply the first entry delta to the first replica entry in the first replicated information base, such that requests for the entry in the first replica will henceforth provide the received data update, the first application module configured to apply the first entry delta after receiving a request from the commit module. A first unlock module is configured to unlock the first data replica entry after the first application module has applied the first entry delta to the first replica entry. Embodiments of the invention may include other replicas configured similar to the first replica descried above.

An embodiment of the invention provides a system for managing data in a network data repository deployed across a plurality of servers. A first replica is configured for communications with other replicas of the plurality of replicas; the first replica is hosted on a server of the plurality of servers. The first replica further comprises a first replicated information base configured to contain at least a portion of the network data repository, the first replicated information base comprising a plurality of replica entries such that each replica entry corresponds to an entry in the network data repository, the first replicated information base further comprising a plurality of replication agreements between each replica and other replicas of the plurality of replicas. A state determination module is configured to determine whether a replication agreement between a replica of the plurality of replicas and another replica of the plurality of replicas is in an inactive state due to a loss of communications, the state determination module further configured to determine that communications have been restored between the first replica and the another replica. A synchronization module is configured to request updated data for entries in a replica of the plurality of replicas that changed during the inactive state of the replication agreement, the synchronization module further configured to control the updating of another replica of the plurality of replicas to resolve the resulting violations of the replication agreement until the replication agreement is restored to active status.

An embodiment of the invention provides a method for managing data in a network data repository deployed across a plurality of replicas, where each replica contains at least a portion of the network data repository and each replica is configured for communications with other replicas of the plurality of replicas, the replicas hosted on server computers. The first replica receives a data update for an entry in the network data repository in a first replica of the plurality of replicas. A copy of the received data update is created for a second replica entry in a second replica of the plurality of replicas, the second replica entry corresponding to the entry in the network data repository. A first entry delta is created for the first replica entry, wherein the first entry delta includes the received data update. The entry is locked in the first replica entry on the first replica, and the first entry delta is validated to determine that it has compatible characteristics with the entry. The copy of the received data update is transmitted across the network to the second replica. A second entry delta on the second replica entry is created, wherein the second entry delta includes the changed data in a format suitable for the second replica entry. The entry in the second replica entry on the second replica is locked by the second entry delta. A success indicator is transmitted from the second replica to the first replica after locking the entry in the second replica entry. The first entry delta is applied to the first replica entry and the second entry delta is applied to the second replica entry, such that requests for the entry in the first replica and the second replica will henceforth provide the data update. The first replica entry is unlocked after applying the first entry delta to the first replica entry and the second replica entry is unlocked after applying the second entry delta to the second replica entry.

An embodiment of the invention provides a method for managing data in a network data repository deployed across a plurality of replicas, wherein each entry in the network data repository corresponds to a replica entry in each of the plurality of replicas and wherein each replica maintains a replication agreement with other replicas of the plurality of replicas. A first replication agreement between a first replica and a second replica is determined to have entered an inactive state due to a loss of communications between the first replica and the second replica. A second replication agreement between the first replica and a third replica is also determined to have become inactive due to a loss of communications between the first replica and the third replica, wherein communications between the second replica and the third replica have not been interrupted. Once communications are determined to have been restored between the first replica and the second and third replicas, then restoring the first replication agreement to an active state by synchronizing the first replica and the second replica to each other and restoring the second replication agreement to an active state by synchronizing the first replica and the third replica to each other.

DETAILED DESCRIPTION OF AN EMBODIMENT OF THE INVENTION

An embodiment of the invention provides a replication and synchronization mechanism that is peer to peer and multi-threaded. Embodiments of the invention may further enable a useable alternative service in the event of a loss of communications between replicas and provides a fully automated recovery upon the recovery of communications between the replicas. The replicas are hosted on computers (e.g., servers), and in some embodiments, multiple replicas are hosted on a single computer. Embodiments of the replication and synchronization mechanism may further provide robust processing in flaky (lossy) networks. The replication and synchronization mechanism may further provide entry level synchronization and support for transactions, according to an embodiment of the invention.

Embodiments of the invention may replicate a database entry n-ways. Additionally, any peer can add, change, or delete an entry, according to an embodiment of the invention. Further, embodiments of the invention may employ a locking mechanism to ensure consistency of entries and updates. The replication and synchronization mechanism is able to merge changes that have been made independently as a result of the loss of communication between peers, according to an embodiment of the invention. Additionally, access to the data is in real time, according to an embodiment of the invention, and increases in memory usage are only fractionally higher than in prior art systems.

Information Model—Replicated Information Base

Figure 1:
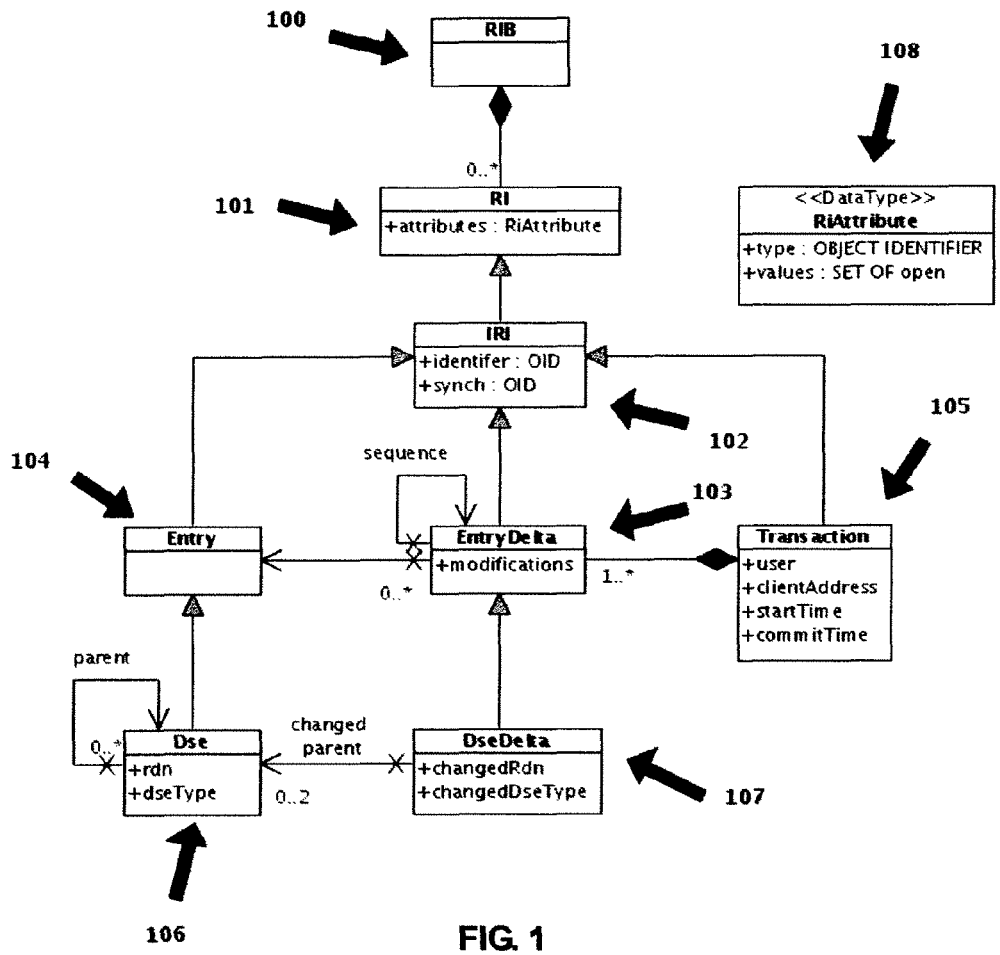
FIG. 1 illustrates a logical diagram of a Replicated Information Base (RIB) 100, according to an embodiment of the invention.

FIG. 1 illustrates a logical diagram of a Replicated Information Base (RIB) 100, according to an embodiment of the invention. The RIB 100 comprises a set of information in which two or more copies of the information are effectively identical to users of that information. "Users" here can refer to both computer programs directly acting upon the data, as well as humans operating computing systems that interact with the data. The RIB 100 enables persistent storage of information on behalf of users of that information, allowing the users to retrieve and modify the information. The following discussion describes how the RIB 100 can be achieved, over and above provision of a non-replicated information base. The RIB 100 may be hosted on one or more server computers, each of which holds a replica of the RIB 100, according to an embodiment of the invention. A server computer may be configured to host more than one RIB 100, according to an embodiment of the invention. Other hardware arrangements may be used in other embodiments of the invention.

The unit of information in the RIB 100 is the RIB Instance (RI) 101. The RIB 100 may have many RIs 101. A given RI 101 is an object that is described by a set of one or more attributes. Each such attribute has an identifier (the "attribute type"), and a set of zero or more values. RiAttribute 108 illustrates a representative attribute for the RI 101, wherein the RiAttribute 108 has a type (e.g., real) and a set of zero or more values (e.g., 1.2, 1.4). There is a convenient Abstract Syntax Notation One (ASN.1) construct for identifying attributes and typing their values, namely the TYPE-IDENTIFIER.

```
RiAttribute ::= SET
{
    type       TYPE-IDENTIFIER.&id
    values SET OF TYPE-IDENTIFIER.&Type
}
Ri ::= SET SIZE (1..MAX) OF RiAttribute
```

Note: The discussion herein makes frequent reference to the Abstract Syntax Notation One (ASN.1) notation that describes, among other things, data structures for representing, encoding, transmitting, and decoding data in telecommunications and computer networking systems. Other notations could be used to express these ideas, and the use of ASN.1 is intended to be exemplary rather than limiting to the scope of the invention disclosed herein.

Information Model—RI Identification

The RIB 100 likely contains a plurality of RIs 101. The RIs 101 are useful when they can be identified, and in particular uniquely identified, according to an embodiment of the invention. At a minimum, therefore, each RI 101 typically has an attribute which provides it with a unique identifier. Note that "unique" typically includes "for the lifetime of the RIB," according to an embodiment of the invention. This extension to the RI 101 is called an Identified RI (IRI) 102.

The IRI 102 can be modeled two ways in ASN.1 notation. One way to model the IRI 102 calls for defining an attribute type for use in the Ri SET, such as:

```
ri-id-id OBJECT IDENTIFIER ::= { rIB-base-id 1 }
ri-id TYPE-IDENTIFIER ::= {OBJECT IDENTIFIER IDENTIFIED BY
                                                      ri-id-id}
Iri ::= Ri (SIZE (1..MAX))
        (CONSTRAINED BY {-- must include ri-id --} )
```

A second way of modeling the IRI 102 calls for defining a new type that explicitly includes the identifier attribute, such as:

```
Ri-ID ::= OBJECT IDENTIFIER
Iri ::= SET
{
    identifier   Ri-ID,
    attributes   Ri
}
```

In the rest of this specification, the latter approach is used to model the additional attributes which are added to the information model of the RIB 100. However, it is important to recognize that this is mainly to aid understanding—the underlying reality is the simple set of attributes. This means that alternative overlays may be applied—a Dse type of Ri might also be interpreted as some other type of Ri if the constraints for that alternative are satisfied, according to an embodiment of the invention.

Information Model—User Information, Deltas and Transactions

The IRI 102 contains information held on behalf of a user (or users), and the user may wish to change that information. When the IRI 102 is first created, it is may be necessary to copy the complete IRI 102 to all replicas (such as the replica 201 shown in FIG. 2). The replicas tend to exist in different locations, e.g., different servers, according to an embodiment of the invention.

If the IRI 102 is subsequently changed, the RIB processing apparatus could just copy the complete IRI 102 again. However, this approach may be difficult in some embodiments. Firstly, the IRIs 102 can be of arbitrary size, and copying them may have a significant bandwidth cost. Secondly, if it is not possible to copy the IRIs 102 immediately (because of communications problems, for example), then two or more replicas may independently apply changes to a given IRI 102, which typically require subsequent merging. RIB program modules configured to accomplish this merging may require more information than just the end results of the sets of the independent changes. Thirdly, any change to the user information may be useful information in its own right, and therefore should be considered part of the RIB 100. Therefore, one may qualify the IRI 102 as either a piece of user information (what the user would typically view as an "entry" in the database), or a change to a piece of user information, such as:

```
Entry ::= Iri
EntryDelta ::= SET
{
    identifier       Ri-ID,
    transaction      Ri-ID,
    entry            Ri-ID,
    sequence         Ri-ID OPTIONAL,
    modifications    SET OF RiAttributeModification OPTIONAL,
    attributes       Ri OPTIONAL
}
RiAttributeModification ::= SEQUENCE
```

```
{
    type        TYPE-IDENTIFIER.&id
    removed     SET OF TYPE-IDENTIFIER.&Type OPTIONAL
    added       SET OF TYPE-IDENTIFIER.&Type OPTIONAL
    qualifiers  BIT STRING OPTIONAL
}
```

In a sense, user updates are restricted to creation of IRIs 102, specifically EntryDeltas 103, according to an embodiment of the invention. When a user wishes to add or change a given Entry 104, the user engages RIB programming functionality that creates an EntryDelta 103. When the Entry 104 is subsequently read, it is the result of the ordered merge of all of the associated EntryDeltas 103 which is returned as the result of the read inquiry.

The RIB 100 includes rules which determine the validity (or invalidity) of the IRIs 102. Only valid IRIs 102 are allowed into the RIB 100, according to an embodiment of the invention. Such rules may be syntactical, applied to the values of individual attributes, or may be semantic, and applicable to a single Entry 104, or multiple Entries 104. One example of semantic rules might be to impose referential integrity between (attributes of) Entries 104. Depending on such rules, an EntryDelta 103 might not only result in an update to its referenced Entry 104, but also to a number of other Entries 104.

If the content of the EntryDelta 103 is valid in its own right, but the resulting Entry 104 is not valid, the RIB processing functionality does not perform the requested change, and the EntryDelta 103 is rejected, according to an embodiment of the invention. In other words, the validity of an EntryDelta 103 is determined by its effect on the associated Entry 104.

The sequence attribute of the EntryDelta 103 allows the changes to be applied in order. Among other things, the sequence attribute identifies the previous changes that were made, if any. When the EntryDelta 103 is created, it is validated both in its own right, and for the effect it has on the referenced Entry 104, and in particular the Entry 104 on completion of all previous changes in the sequence. This is achieved by validating the Entry 104 assuming the changes have been performed. For a consistent RIB 100, the combination of the Entry 104 and sequence attributes should typically be unique.

The "modifications" in the EntryDelta 103 describe the set of attributes that have been modified in the Entry 104. For each such attribute, the values that have been added, and the values that have been removed, are listed, together with zero or more qualifiers further describing the modification. Such qualifiers might indicate that the attribute has been newly added to the Entry, or removed from the entry, or might indicate that the added values are relative to the removed values (e.g., an increment).

Further attributes of the EntryDelta 103 may include information that supports the merging process mentioned above, and/or to provide other change information that may be of use either to the RIB processing apparatus, or to the users of the RIB, according to an embodiment of the invention.

A Transaction 105 represents a third type of IRI 102 that is defined to provide context for change IRIs 102, and to allow multiple changes to multiple Entries to be grouped and applied atomically. The Transaction 105 type of IRI 102 is referenced within each change IRI 102.

```
Transaction ::= SET
{
    identifier      Ri-ID,
    clientAddress   OCTET STRING,
    user            PrintableString,
    startTime       INTEGER,
    commitTime      INTEGER,
    attributes      Ri
}
```

A user of the RIB 100 typically has a physical address, and such users are also typically users of a logical database as well, according to an embodiment of the invention.

The start time is the time that the transaction 105 was started (i.e., the time of creation of the transaction IRI 102), and the commit time is the time when the EntryDeltas 103 were added to the RIB 100, and the associated Entries 104 updated.

Further attributes of the Transaction 105 may include any other information which may be of use, either to the RIB processing apparatus, or to the users of the RIB, according to an embodiment of the invention.

Information Model—X.500 Information

The RIB 100 may be configured to support an X.500 Directory, according to an embodiment of the invention. In this context, a replica, such as the Replica 201 of FIG. 2, serves as a Directory System Agent (DSA), and user information may take the form of a DSA Specific Entry (DSE) 106. Accordingly, the Entry 104 can be extended to define a given DSE 106, and likewise EntryDelta 103 to define a DSEDelta 107.

```
Dse ::= SET
{
    identifier   Ri-ID,
    parent       Ri-ID OPTIONAL,    -- present unless
    root
    rdn          RelativeDistinguishedName OPTIONAL,
    -- present unless root
    dseType      DSEType,           -- see X.501
    attributes   Ri
}
```

The parent and rdn components together provide what is termed the "implicit fabric" in the DSA Information Model defined in X.501 Section 23. For a given parent, the rdn must typically be unique.

The attributes component provides the set of attributes that together make up the Directory Entry, Directory Subentry, DSA-Specific Attributes, and DSA-Shared Attributes. Individual attributes are defined to be in one of these subdivisions, so that explicit subdivision is not required.

```
DseDelta ::= SET
{
    identifier       Ri-ID,
    transaction      Ri-ID,
    dse              Ri-ID,
    sequence         Ri-ID OPTIONAL,
    changedParent    RiAttributeModification OPTIONAL,
    changedRdn       RiAttributeModification OPTIONAL,
    changedDseType   RiAttributeModification OPTIONAL,
    modifications    SET OF RiAttributeModification OPTIONAL,
    attributes       Ri OPTIONAL
}
```

Replication Model

Figure 2:
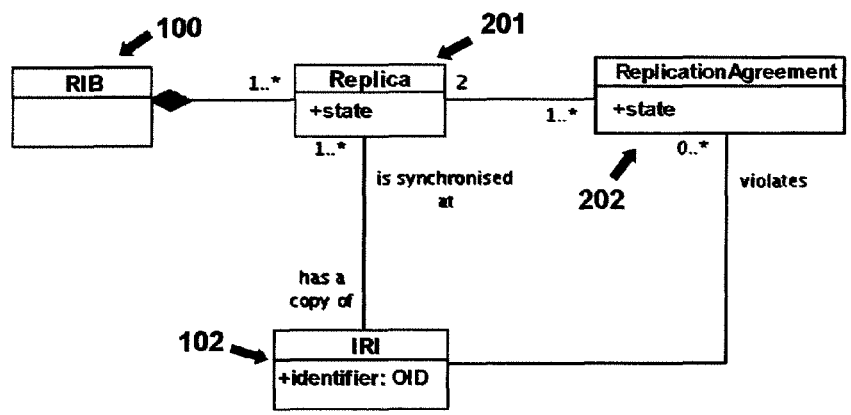
FIG. 2 illustrates a replication model, according to an embodiment of the invention.

FIG. 2 illustrates a replication model, according to an embodiment of the invention. A replica 201, which is a complete copy of the RIB 100, may have a number of replication agreements 202 with other replicas. Each such replication agreement 202 is between a pair of replicas 201.

When a new replica 201 is added to the RIB 100, then replication agreements 202 can be created between the new replica 201 and each of the existing replicas. Each replica 201 has a specific state at any given time, as discussed further in FIG. 3, and each replication agreement 202 also has a specific state, as discussed further in FIG. 4.

An IRI 102 is said to be synchronized at a replica 201 if it has been successfully copied to the replica 201 (including if the replica was the originating replica). If an IRI 102 is not successfully copied to the replica 201, it is said to "violate" the replication agreement 202 between any pair of replicas where one of the replicas has a copy of the IRI 102, and the other replica does not have a copy of the IRI 102.

Replication attempts are only made for those IRIs 102 that do not violate a replication agreement 202, according to an embodiment of the invention. Once a replication agreement 202 has been violated it is up to the synchronization processing to repair the replication agreement 202 with respect to the IRI 102.

Figure 3:
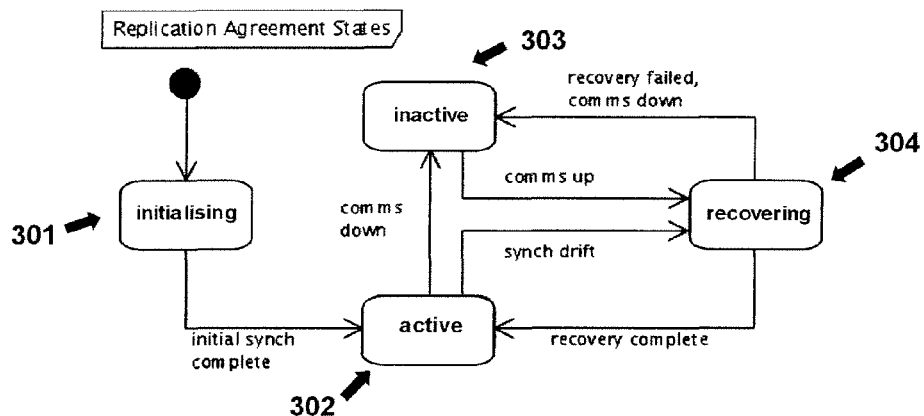
FIG. 3 illustrates representative states of the replication agreement 202 shown in FIG. 2, according to an embodiment of the invention.

FIG. 3 illustrates representative states of the replication agreement 202 shown in FIG. 2, according to an embodiment of the invention. The replication agreement 202 has one state at any given time, which can be one of initializing 301, active 302, inactive 303, or recovering 304.

The replication agreement 202 attains the initializing state 301 at creation and remains in this state until the replica 201 has achieved synchronization for the first time ("initial synch complete") whereupon the replication agreement 202 attains the active state 302. The synchronization may be supported by a synchronization module, according to an embodiment of the invention. The synchronization module may be located on the server along with the other components described herein, according to an embodiment of the invention.

In the active state 302, the new EntryDelta 103 may be replicated if the Entry 104 instance is synchronized at the other replica associated with the agreement. Also in this state, entry synchronization may be attempted for any entries that violate the replication agreement 202. The replication agreement 202 also re-attains the active state 302 upon a successful recovery, according to an embodiment of the invention.

The replication agreement 202 may attain the inactive state 303 upon a failure, such as loss of communications between replicas or upon the failure of a recovery. In the inactive state 303, the new EntryDeltas 103 are not replicated, according to an embodiment of the invention. Population of a new replica 201 is the only form of synchronization attempted in the inactive state 303, according to an embodiment of the invention.

In the recovering state 304, the new EntryDeltas 103 are not replicated because recovery synchronization is in progress. The recovering state 304 is entered when communications are established between the replicas, or if active agreement is no longer considered viable because of the number of individual Entries 104 that violate the agreement.

Figure 4:
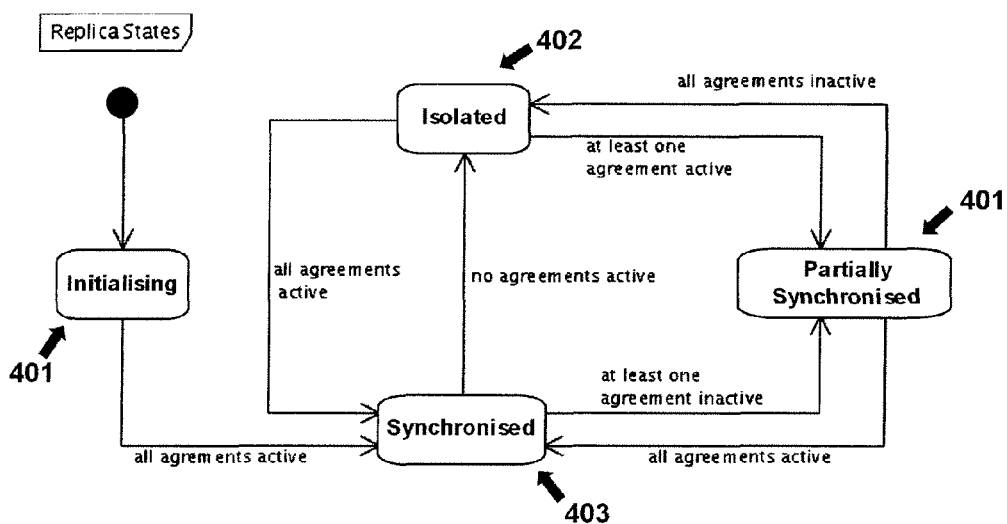
FIG. 4 illustrates that the replica 201 also has a given state at any instance, according to an embodiment of the invention.

FIG. 4 shows that the replica 201 also has a given state at any instance, according to an embodiment of the invention. The replica's 201 states may be one of initializing 401, isolated 402, partially synchronized 403, or synchronized 404.

A new replica 201 attains the initializing state 401 and typically remains in it until all of its replication agreements 202 are active for the first time whereupon the replica 201 enters into the synchronized state 403.

In the synchronized state 404, all replication agreements are active.

In the isolated state 402, all replication agreements 202 for the replica 201 are inactive or recovering. For example, the replication agreements 202 are in either the inactive state 303 or the recovering state 304 shown in FIG. 3.

In the partially synchronized state 403, at least one replication agreement 202 is active and at least one replication agreement 202 is either inactive or recovering.

Replication and Synchronization Example

Figure 5:
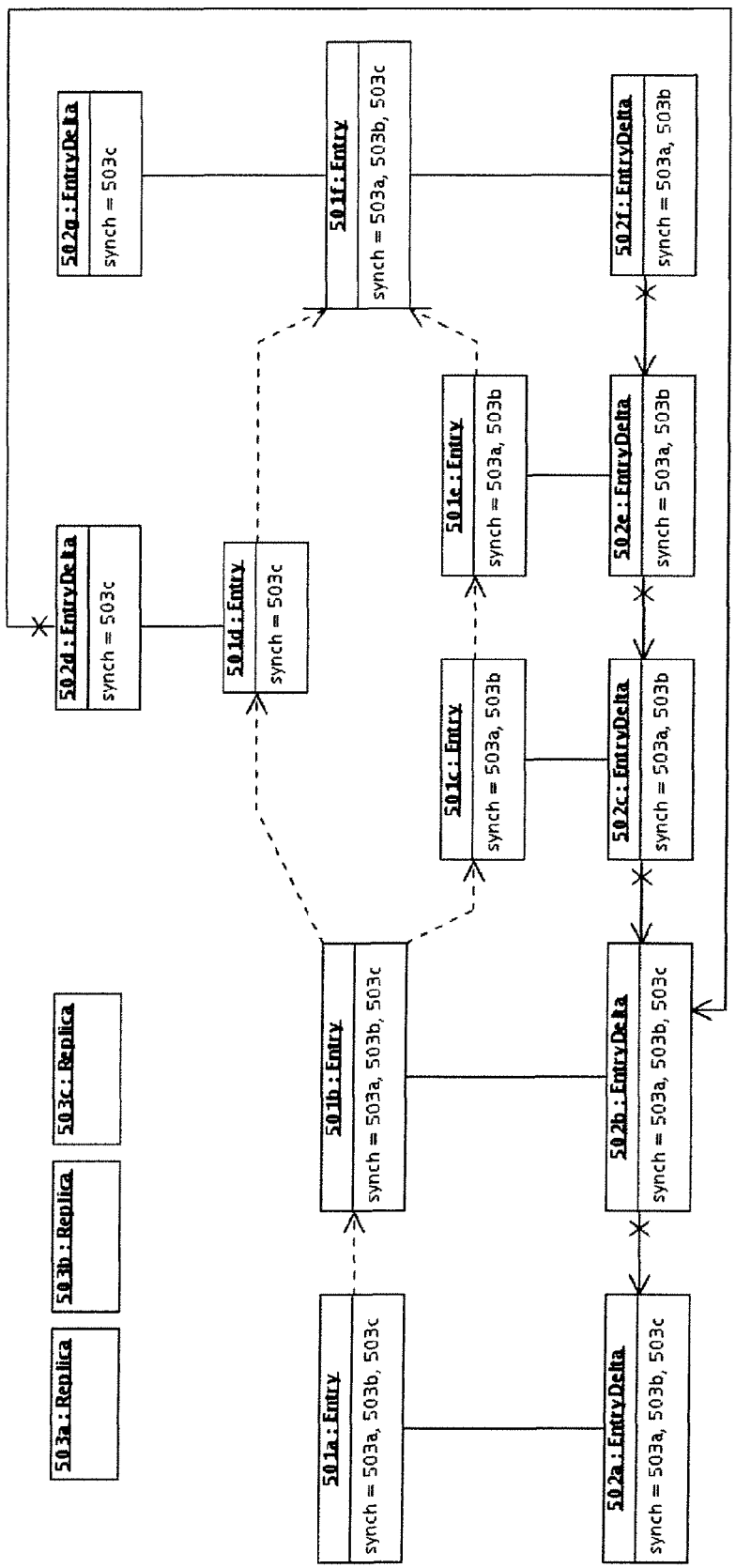
FIG. 5 illustrates each "version" of the Entry 501 as a separate instance in the RIB (e.g., the RIB 100), uniquely identified by a combination of its own id and an associated EntryDelta 502, according to an embodiment of the invention.

This example focuses on a single Entry 501 over a period of time, shown as the Entries 501a-501f, during which several EntryDeltas 502a-502g are applied. FIG. 5 shows each "version" of the Entry 501 as a separate instance in the RIB (e.g., the RIB 100), uniquely identified by a combination of its own id and an associated EntryDelta 502. The time axis in FIG. 5 is from left to right. At any one time, each replica 503a-503c holds a single "current" version of the Entry 501, which is that associated with the most recent EntryDelta 502 held at that replica.

In order to simplify the figure, the "synchronized" associations between the IRIs 102 and the Replicas 503a-503c are shown as values of the "synch" attribute, rather than lines between the instances.

FIG. 5 begins with the leftmost Entry 501a and the associated Entry Delta D1 502a which was responsible for the content of the Entry 501a. Here, the EntryDelta 502a was successfully copied to all the replicas 503a-503c, so that both the EntryDelta 502a and the Entry 501a are synched at all of the replicas 503a-503c. Subsequently, a second EntryDelta 502b is added to the RIB 100, resulting in a new version of Entry 501. As with the EntryDelta 502a, the EntryDelta 502b is successfully copied to all three replicas 503a-503c.

A third EntryDelta 502c is then received at replica 503a, for example, and is successfully copied to replica 503b, but cannot be copied to replica 503c because of a communications failure. The result is that the Entry 501c violates the 503a-503c and 503b-503c ReplicationAgreements. Synchronization is typically required to resolve this violation.

A fourth EntryDelta 502d is received at replica 503c, but there is still a communications problem and so it cannot be copied to either replica 503a or replica 503b. As before, the result is that the resulting Entry 501d is not synched with either replica 503a or replica 503b.

At this point there are two EntryDeltas, the EntryDelta 502c and the EntryDelta 502d, which have "identical" pairs of entry and sequence attributes for the Entry 501. This means that even if communications had been restored so that the EntryDelta 502d could be copied to replica 503a and replica 503b, both of those replicas would not be able to accept the EntryDelta 502d, since doing so would violate the rule that the pair must be unique.

A fifth EntryDelta 502e is received at replica 503b, and even though communications has now been restored to replica 503c, there is no attempt to copy the EntryDelta 502e to replica 503c because the current version of Entry 501 (501c) is not synched to replica 503c. Thus, the EntryDelta 502e and Entry 501e are synched with just replica 503a and replica 503c.

The restoration of communications initiates the synchronization processing associated with the RIB 100, which for Entry 501 involves the reconciliation or merge of the different "current" versions (501d and 501e). Synchronization derives two new EntryDeltas, the EntryDelta 502g and the EntryDelta 502f, which independently update the Entries 501d and 501e to give a single common version (501f) which is therefore synched at all of 503a-503c.

If there was no EntryDelta 502d, then the EntryDelta 502g is the combination of the EntryDelta 502c and the EntryDelta 502e, and the EntryDelta 502f is a null update. Note that the EntryDelta 502f may still be created in this circumstance, according to an embodiment of the invention, since the version of Entry 501 on replica 503a and replica 503b has changed—in particular the synch attribute has a new value of 503c.

Replication Processing

Replication is the means by which the copies of the IRIs 102 are made so that each of the replicas, such as the replicas 503a-503c shown in FIG. 5, has the complete and up-to-date RIB 100.

By the time the external user is informed of the success (or failure) of any requested change to the RIB 100, all replicas of the RIB 100 fully reflect that change. This is achieved by use of a two-phase approach, according to an embodiment of the invention. Firstly, the change is made at all replicas, within the scope of a transaction, according to an embodiment of the invention. When all replicas have accepted the change, the external user is informed of the success of the update, again within the scope of the transaction. Finally, when the external user requests that the transaction be committed, the change is "simultaneously," or "concurrently," applied or committed to the RIB 100 at each replica, so that it is visible outside the scope of the transaction.

Considering the above process with respect to IRIs 102, the three subclasses (the Entry 104, the EntryDelta 103, and the Transaction 105) require different replication handling to ensure correctness of the RIB 100—in particular where changes might be made simultaneously on multiple replicas.

The simplest of the three subclasses is the Transaction 105, which is simply copied—the external RIB 100 users must ensure uniqueness, according to an embodiment of the invention.

The IRIs of the Entry type 104 are not explicitly copied, according to an embodiment of the invention. The copying is instead achieved by locally applying the copied EntryDeltas 103 at each replica (e.g., the replicas 503a-503c shown in FIG. 5), according to an embodiment of the invention.

For an EntryDelta 103, the combination of entry and sequence attributes must be unique, according to an embodiment of the invention. Thus, one should ensure that if two EntryDelta 103 instances with a common Entry 104 are created simultaneously on two replicas, they are correctly sequenced. This could be performed by employing the synchronization processing described below, since it is likely necessary anyway in the event of a communications failure. However, when communications are available, for efficiency and performance a preferred approach involves the use of a lock, and, if necessary, a retry mechanism, according to an embodiment of the invention.

The following sequence diagrams consider the replication of EntryDelta 103 instances under a number of conditions in order to explore an embodiment of the lock and retry mechanism. Replication of Transactions 105 is initially shown, and then assumed.

The following example models a single Entry 104 instance which gets updated by an EntryUpdate, rather than causing the creation of a new version of the Entry 104. This approach allows the representation of a lock on the Entry 104, although it is of course possible to model an equivalent where there is an instance for each version.

Replication Methods/Modules

Figure 6:
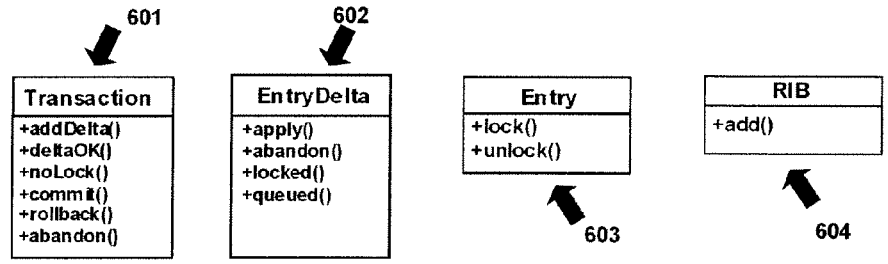
FIG. 6 illustrates replication processing in terms of a number of methods on classes such as a Transaction 601, an EntryDelta 602, an Entry 603 and a RIB 100 604, according to an embodiment of the invention.

As shown in FIG. 6, replication processing is described in terms of a number of methods on classes such as a Transaction 601, an EntryDelta 602, an Entry 603 and a RIB 100 604, according to an embodiment of the invention. The methods described herein are also amenable to implementation as a series of modules, e.g., hardware modules and/or software modules, according to an embodiment of the invention. The methods/modules are amenable to operation on one or more computers, according to an embodiment of the invention.

Transaction Methods/Modules

An embodiment of the Transaction 601 includes the following methods. The methods described herein are also amenable to implementation as a series of modules, e.g., hardware modules and/or software modules, according to an embodiment of the invention. The methods/modules are amenable to operation on one or more computers, according to an embodiment of the invention.

The addDelta( ) method adds a new EntryDelta 602 instance into an ongoing Transaction 601. This method is used to both create the EntryDelta 602 on the initiating replica, and to copy it between replicas, such as the replicas 503a-503c shown in FIG. 5.

The deltaOK( ) method allows the EntryDelta 602 instance to indicate to the Transaction 602 that it considers itself valid. The Transaction 601 instances on the "copied to" replicas likewise use the method to indicate the same information about the copied EntryDelta 602 back to the originating copy of the Transaction 602.

The noLock( ) method allows the EntryDelta 602 instance to indicate to the Transaction 601 that it is unable to obtain the lock for the referenced Entry 603. The Transaction 601 instances on the "copied to" replicas likewise use the method to indicate back to the originating copy of the Transaction 601.

The commit( ) method signals that the transaction is complete and should be committed. The Transaction 601 on the originating replica invokes the commit( ) on all replica copies, according to an embodiment of the invention.

The rollback( ) method signals that the transaction is complete but should be rolled back (i.e., not applied). The Transaction 601 on the originating replica invokes the rollback( ) on all copies.

The abandon( ) method allows the Transaction 601 on the originating replica to signal to the Transaction 601 copies that it has abandoned an EntryDelta 602 because it failed to obtain the lock for the referenced Entry 603.

Entrydelta Methods/Modules

An embodiment of the EntryDelta 602 includes the following methods/modules. The methods described herein are also amenable to implementation as a series of modules, e.g., hardware modules and/or software modules, according to an embodiment of the invention. The methods/modules are amenable to operation on one or more computers, according to an embodiment of the invention.

The apply( ) method instructs the EntryDelta 602 to apply itself to the RIB 604.

The abandon( ) method instructs the EntryDelta 602 to abandon the update and destroy itself.

The locked( ) method allows the associated Entry 603 to indicate that it is successfully locked.

The queued( ) method allows the associated Entry 603 to indicate that its lock attempt has been queued because another EntryDelta 602 has already been granted the lock.

Entry Methods/Modules

An embodiment of the Entry 603 includes the following methods/modules. The methods described herein are also amenable to implementation as a series of modules, e.g., hardware modules and/or software modules, according to an embodiment of the invention. The methods/modules are amenable to operation on one or more computers, according to an embodiment of the invention.

The lock( ) method instructs the Entry 603 to lock itself for a specific EntryDelta 602 instance, so that no other EntryDelta 602 instance can be applied to that version of the Entry 603. Note that the response from this method is either the locked( ) or queued( ) methods of the EntryDelta 602 and have been represented in the diagrams as being asynchronous. In many cases, however, a synchronous result code to this method could be used to affect the same logic in an efficient manner, according to an embodiment of the invention.

The unlock( ) method instructs the Entry 603 to unlock itself.

RIB Methods/Modules

The add( ) method allows an EntryDelta 602 to add itself and its associated version of the Entry 603 into the RIB 604, so that it becomes visible outside of the transaction. The methods described herein are also amenable to implementation as a series of modules, e.g., hardware modules and/or software modules, according to an embodiment of the invention. The methods/modules are amenable to operation on one or more computers, according to an embodiment of the invention.

Update with No Contention

Figure 7:
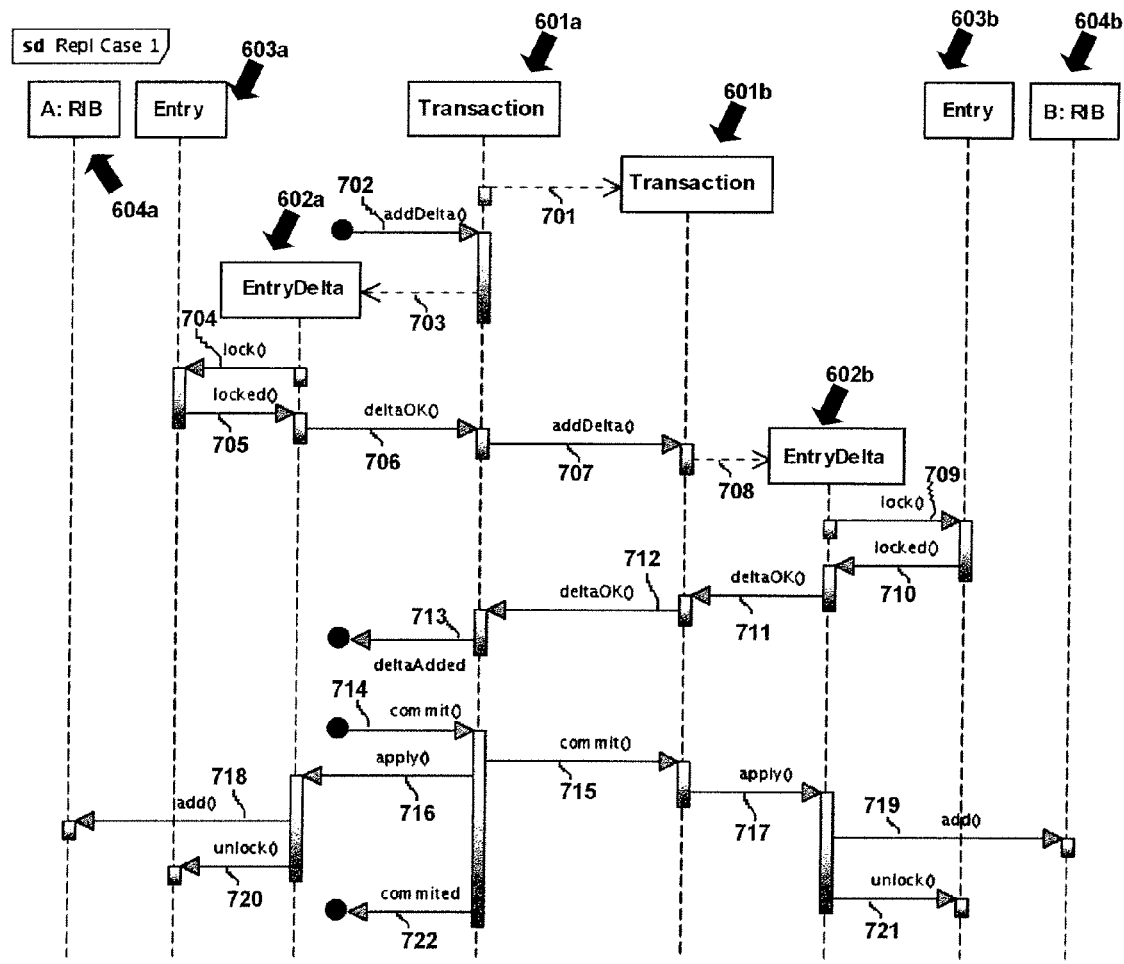
FIG. 7 illustrates an updating of the RIB with no contention, according to an embodiment of the invention.

FIG. 7 illustrates an updating of the RIB with no contention, according to an embodiment of the invention. The first scenario to consider is the simplest, where there is no contention for the lock. It is anticipated that in a RIB (such as the RIB 100 shown in FIG. 1, having many Entry 104 instances) this will be "normal" processing since it will likely be rare for the same Entry 104 instance to be referenced simultaneously in more than one EntryDelta 103.

The sequence diagram in FIG. 7 shows the (copy) instances on both of the replicas involved in this first scenario, according to an embodiment of the invention. A transaction 601a has been created in one replica associated with RIB 604a, and creates a copy of itself in the second replica associated with RIB 604b (step 701). The external user which owns the transaction requests the addition of an EntryDelta 602a (step 702). The EntryDelta 602a is created on the originating replica (step 703).

The EntryDelta 602a locks the Entry 603a (step 704). The lock is immediately successful (step 705). The EntryDelta 602a is validated against the Entry 603a, and is deemed valid (step 706). The EntryDelta 602a is copied to the replica transaction 601b (step 707). The EntryDelta 602b copy is created (step 708). The EntryDelta 602b copy locks the copy of the Entry 603b on that replica (step 709). The lock is immediately successful (step 710). The EntryDelta 103 copy is deemed valid (step 711).

The validity is signaled to the original copy of the transaction (step 712). Both the EntryDelta 602a and the copy EntryDelta 602b are valid, so the requesting entity can be informed of the success (step 713).

At some time later, the requesting entity commits the transaction (step 714). The transaction copy is committed (step 715). The EntryDelta 602a is applied (step 716). The EntryDelta 602b copy is applied (step 717). The EntryDelta 602a is added into the RIB 604a (i.e., is made visible) (step 718). The EntryDelta 602b copy is added into the RIB 604b (i.e., is made visible)(step 719). The Entry 603a is unlocked (step 720). The Entry 603b copy is unlocked (step 721). The external user is informed that the transaction has been successfully committed (step 722).

Simultaneous Updates on Multiple Replicas—No Deadlock

Figure 8:
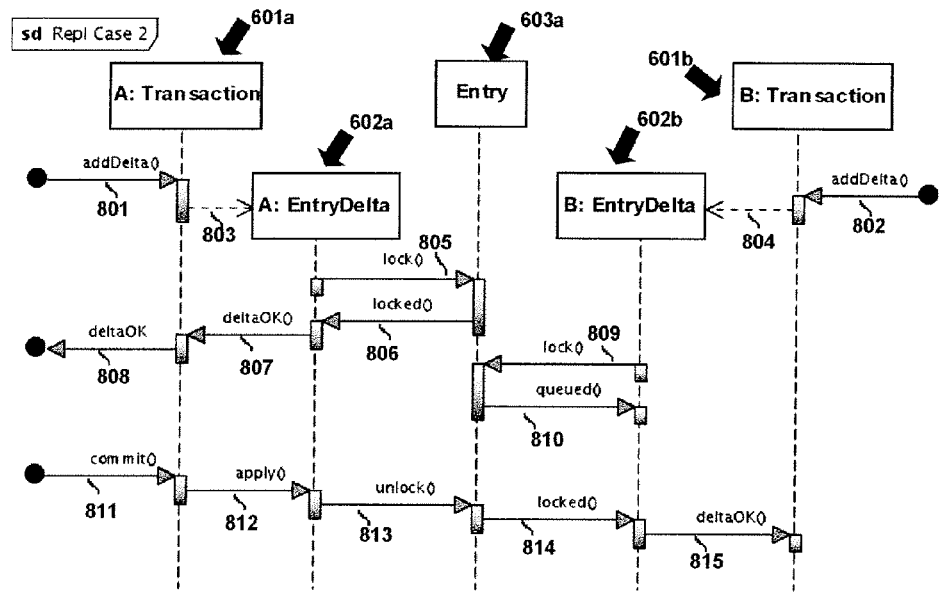
FIG. 8 illustrates what happens if two EntryDeltas 602a-602b, both referencing the same Entry 603a, are created simultaneously, in different Transactions 601a-601b, according to an embodiment of the invention.

FIG. 8 illustrates what happens if two EntryDeltas 602a-602b, both referencing the same Entry 603a, are created simultaneously, in different Transactions 601a-601b, according to an embodiment of the invention. If the two Transactions 601a-601b are initiated in the same replica (e.g., in the RIB 604a), queuing typically occurs since the same copy of the Entry 603a is locked. The potential exists for deadlocks, however, if the Transactions 601a-601b are initiated in different replicas (e.g., in the RIB 604a and the RIB 604b).

The sequence diagram of FIG. 8 shows the case where the deadlock is avoided simply by the ordering of the processing, according to an embodiment of the invention. Note that the instances are shown for one of the replicas only.

An EntryDelta 602a for Transaction 601a is copied from the originating replica (step 801). (Note: This step is similar to step 707 in FIG. 7). At the same time, the external user which owns the Transaction 601b requests the addition of an EntryDelta 602b (step 802). The EntryDelta 602a copy for Transaction 601a is created (step 803). The EntryDelta 602b for Transaction 601b is created (step 804). The EntryDelta 602a copy for Transaction 601a locks the Entry 603a copy (step 805). The lock is immediately successful (step 806).

The EntryDelta 602a copy for Transaction 601a is deemed valid (step 807). The validity is signaled to the original transaction (step 808). The EntryDelta 602b for Transaction 601b locks the Entry 603a copy (step 809). The lock request is queued (step 810). The EntryDelta 602b waits for the lock to be granted.

The copy of Transaction 601a is committed (step 811). The EntryDelta 602a copy for Transaction 601a is applied (step 812). The Entry 603a copy is unlocked (step 813). The lock is granted to the EntryDelta 602b for Transaction 601b (step 814). The EntryDelta 602b for Transaction B is deemed valid (step 815). The validation at this point includes any changes resulting from the EntryDelta 602a of Transaction 601a. Processing may continue as in the previous sequence, according to an embodiment of the invention.

Simultaneous Updates on Multiple Replicas—Deadlock

Figure 9:
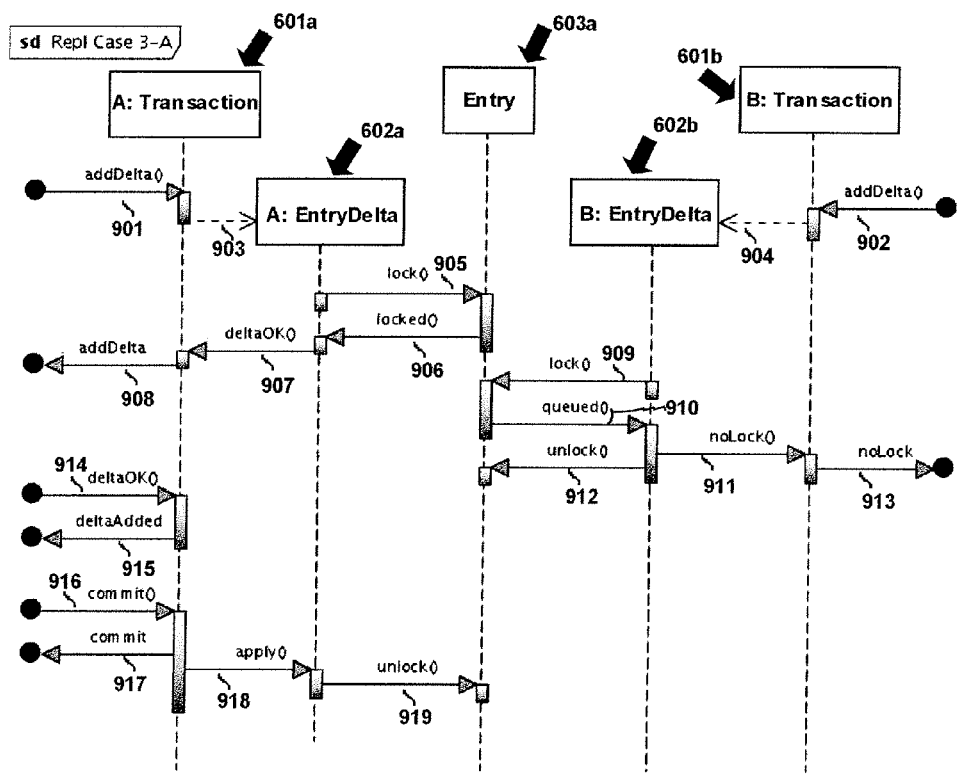
FIGS. 9-10 illustrate a case where the deadlock cannot be avoided by the ordering of the processing, so that additional action must be taken, according to an embodiment of the invention.
Figure 10:
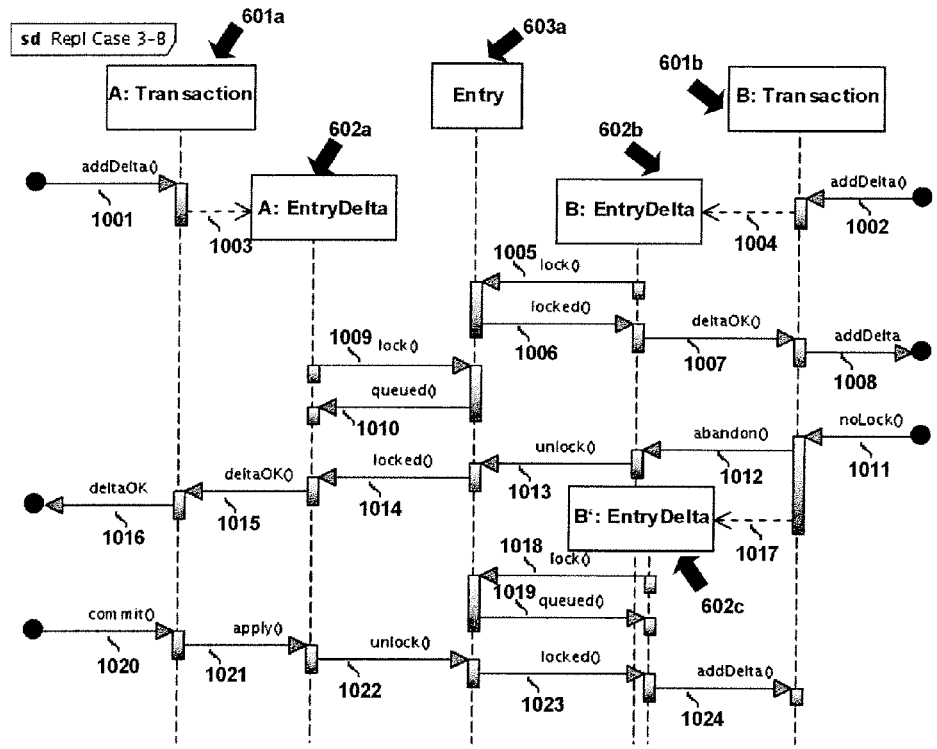

FIGS. 9-10 illustrate the case where the deadlock cannot be avoided by the ordering of the processing, so that additional action must be taken, according to an embodiment of the invention. FIG. 9 illustrates a replica that originates Transaction 601a, and FIG. 10 shows the replica that originates the Transaction 601b.

The external user which controls Transaction 601a requests the addition of an EntryDelta 602a (step 901). An EntryDelta 602b for Transaction 601b is copied from the originating replica (step 902). The EntryDelta 602a for Transaction 601a is created (step 903). The EntryDelta 904 copy for Transaction 601b is created (step 904). The EntryDelta 602a for Transaction 601a locks the Entry 603a (step 905). The lock is immediately successful (step 906).

The EntryDelta 602a for Transaction 601a is validated against the Entry 603a, and is deemed valid (step 907). The EntryDelta 602a is copied to the replica Transaction 601a (step 908). The EntryDelta 602b copy for Transaction 601b locks the Entry 603a (step 909). The lock request is queued (step 910). The EntryDelta 602b copy for Transaction 601b applies a rule (such as the one discussed below) and determines that it should abandon the queued lock, and indicates such to Transaction 601b (step 911). The lock request is withdrawn (step 912). The failed lock is signaled to the original Transaction 601b (step 913).

As a result of the failed lock handled in Transaction 601b, Transaction 601a can proceed on the remote replica, as described for the sequence below (step 914). The end result is the EntryDelta 103 for Transaction A is deemed valid at all replicas.

The requesting entity is informed of the success (step 915). At some point later, the requesting entity commits the transaction (step 916). The transaction copy is committed (step 917). The EntryDelta 602a is applied (step 918). The Entry 603a is unlocked (step 919). At this point, the EntryDelta 602b for Transaction 601b can be reattempted, as described in the sequence below.

FIG. 10 illustrates the replica that originates the Transaction 601b, according to an embodiment of the invention. The EntryDelta 602a for Transaction 601a is copied from the originating replica (step 1001). The external user which owns the Transaction 601b requests the addition of the EntryDelta 602b (step 1002).

The EntryDelta 602a copy for the Transaction 601a is created (step 1003). The EntryDelta 602b for Transaction 601b is created (step 1004). The EntryDelta 602b for the Transaction 601b locks the Entry 603a (step 1005). The lock is immediately successful (step 1006). The EntryDelta 602b for the Transaction 601b is validated against the Entry 603a, and is deemed valid (step 1007). The EntryDelta 602b for the Transaction 601B is copied to the replica Transaction 601b (step 1008). The EntryDelta 602a copy for the Transaction 601a locks the Entry 603a (step 1009).

The lock request is queued (step 1010). The EntryDelta 602a copy for Transaction 601a applies the same rule as in the previous sequence, but this time the result is to wait for the lock. The failed lock indication is received from the other replica (step 1011). The transaction abandons the EntryDelta 602b, in order to retry it (step 1012). The Entry 603a is unlocked (step 1013). The queued lock is granted to the EntryDelta 602a for the Transaction 601a (step 1014). The EntryDelta 602a copy for Transaction 601a is validated against the Entry 603a, and is deemed valid (step 1015).

The validity is signaled to the original transaction (step 1016). A second EntryDelta 602c for the Transaction 601b is created (i.e., it is retried) (step 1017). The second EntryDelta 602c for the Transaction 601b locks the Entry 603a (step 1018). The lock request is queued (step 1019).

The copy of the Transaction 601a is committed (step 1020). The EntryDelta 602a copy for the Transaction 601a is applied (step 1021). The Entry 603a copy is unlocked (step 1022). The queued lock is granted to the second EntryDelta 602c for the Transaction 601b (step 1023). The EntryDelta 602c for the Transaction 601b is deemed valid (step 1024). The validation at this point typically includes any changes resulting from the EntryDelta 602a of the Transaction 601a. Processing of the EntryDelta 602c continue as previously described.

Reference is made in the above descriptions to a rule which may be applied by an EntryDelta 103 copy when a lock is queued to decide whether to wait or to abandon the EntryDelta 103, and retry from the beginning. The result of the rule should be identical on all replicas (irrespective of how many there are), for a given transaction, to ensure successful serialization of the EntryDelta 103, according to an embodiment of the invention. Two possible rules which might be applied are as follows:

assign each replica a unique integer identifier. Wait if the identifier of the originating replica is less than the identifier of the originating replica of the EntryDelta 103 that has the lock. Abandon otherwise.

assign each external user a "priority." Wait if the priority of the user owning the transaction is greater than the priority of the user owning the transaction with the Entry- Delta 103 that has the lock. Abandon otherwise. If it is the same user for both transactions, revert to the previous rule.

Figure 11:
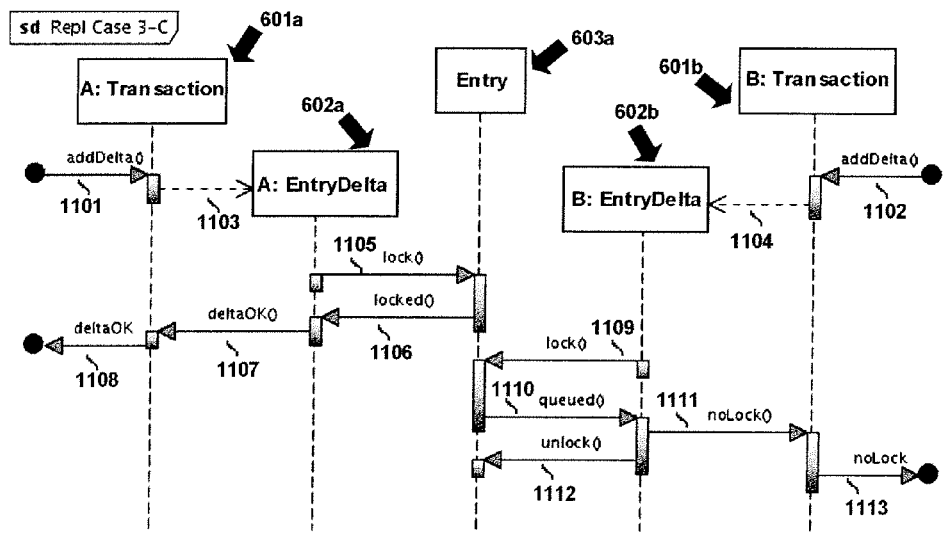
FIGS. 11-12 illustrate the actions of a third and fourth replica, given the scenario of the two sequences shown in FIGS. 9-10, according to an embodiment of the invention.
Figure 12:
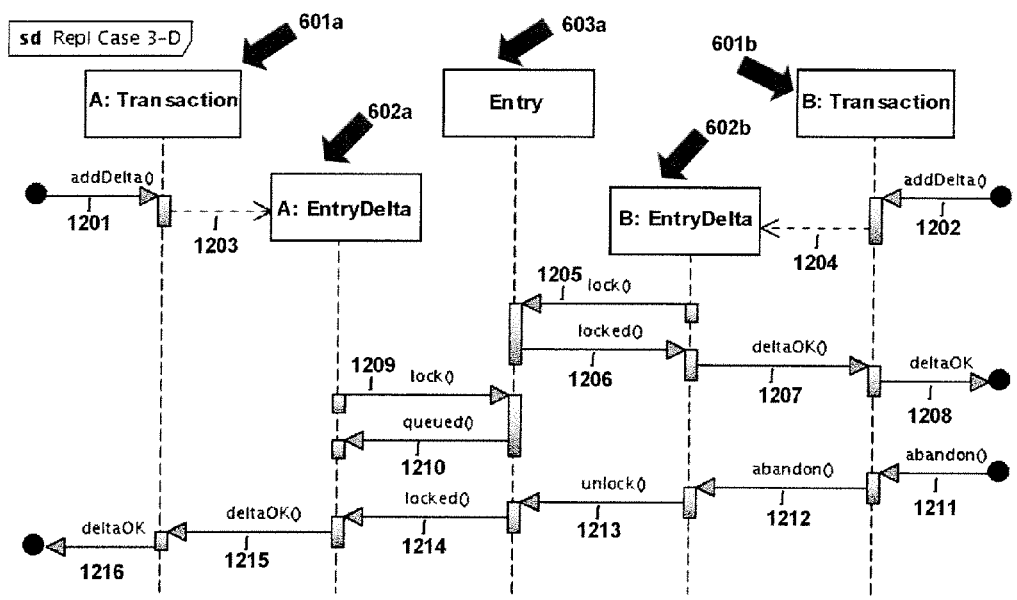

FIGS. 11-12 illustrate the actions of a third and fourth replica, given the scenario of the two sequences shown in FIGS. 9-10, according to an embodiment of the invention.

In FIG. 11, at the third replica, the EntryDelta 602a for the Transaction 602a gets the lock ahead of the EntryDelta 602b for the Transaction 602b. This means that when the wait/abandon rule is applied at step 1010, the "correct" decision is made to back off in the Transaction 601b case.

In FIG. 12, at the fourth replica, however, the EntryDelta 602b for the Transaction 601b gets the lock ahead of the EntryDelta 602a for the Transaction 601a. When the wait/abandon rule is applied at step 1010, again, the correct decision is made, this time to wait for the lock. Subsequently, the Transaction 601b's EntryDelta 602b is abandoned, releasing the lock to allow the Transaction 601a case to proceed to completion. Note that the abandonment at step 1211 would have been generated by the Transaction 601b instance at step 1011 of the sequence shown in FIG. 10, according to an embodiment of the invention.

Synchronisation Processing

It may not always be possible to successfully perform real time replication between replicas. For example, if communications are lost between one or more replicas, clearly no replication is possible. It is not acceptable to prevent changes to the RIB 100 during this time, and consequently there will likely be IRIs 102, or versions of IRIs 102, which exist in some replicas, but not in others.

Synchronization is the means by which copies of the missing IRIs 102 can be made at the replicas which do not have them, and inconsistencies can be corrected, so that ReplicationAgreements 202 are no longer violated.

Scenarios Requiring Synchronization

Figure 13:
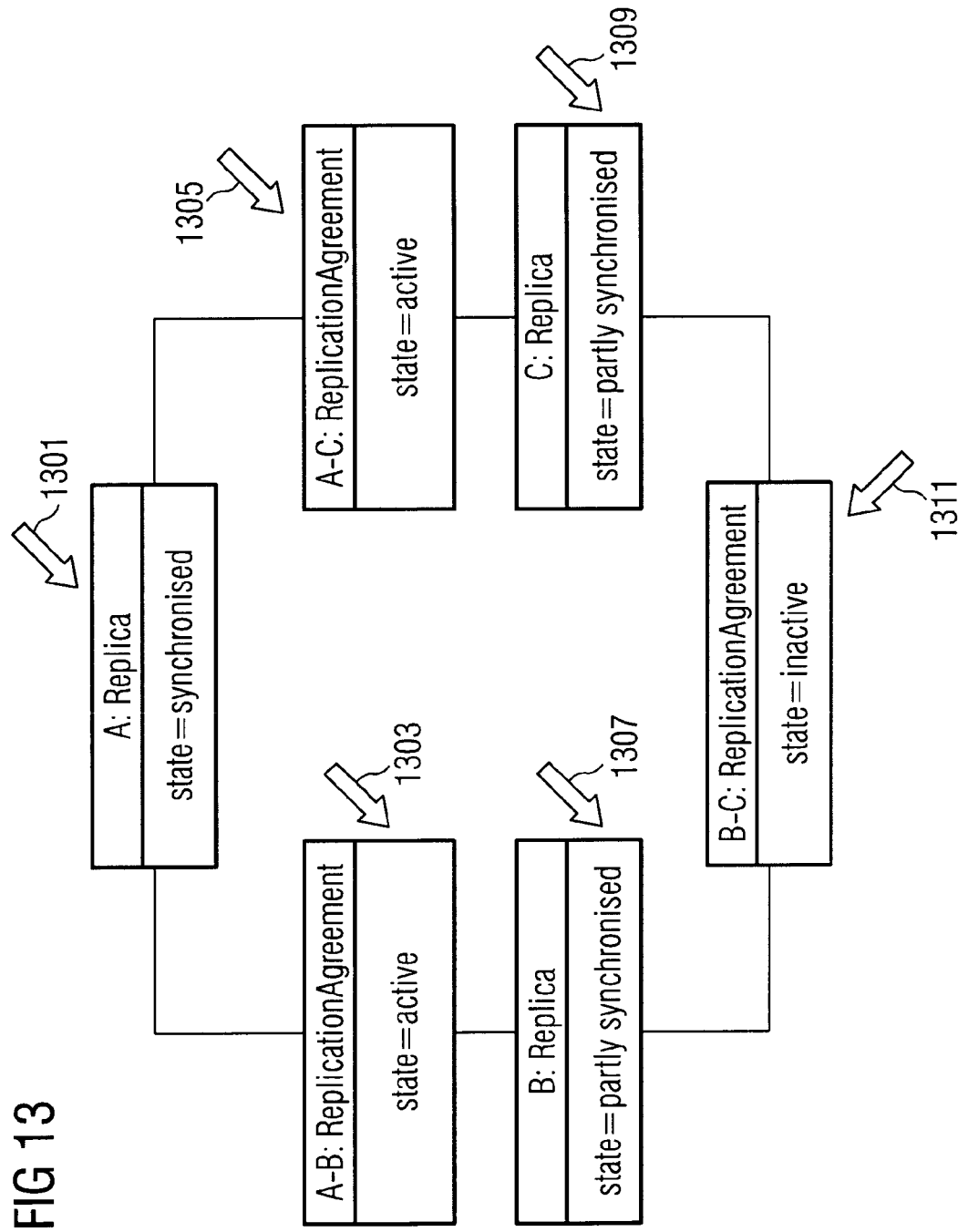
FIG. 13 illustrates a scenario requiring synchronization because of an inactive replication agreement, according to an embodiment of the invention.
Figure 14:
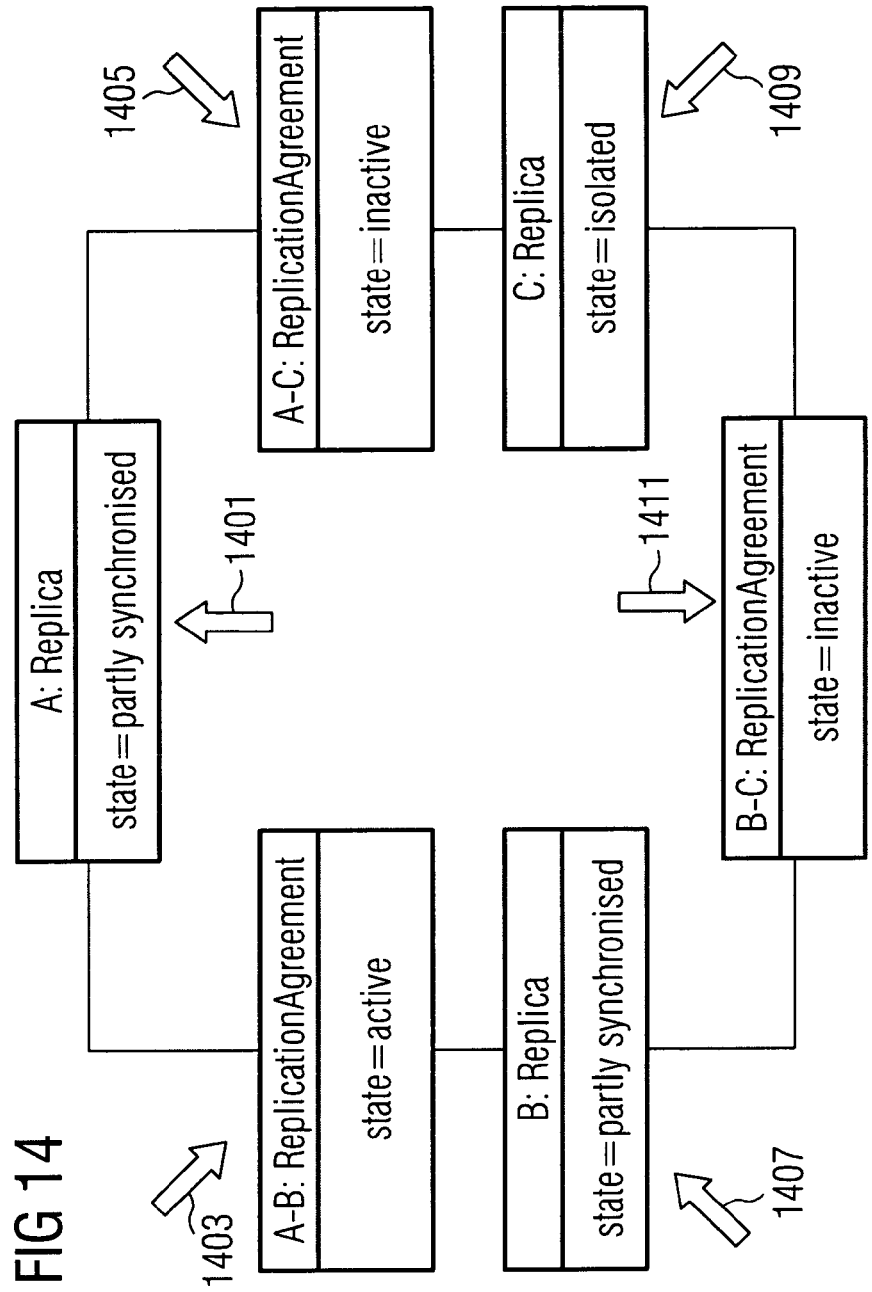
FIG. 14 illustrates a scenario requiring synchronization because of an isolated replica, according to an embodiment of the invention.
Figure 15:
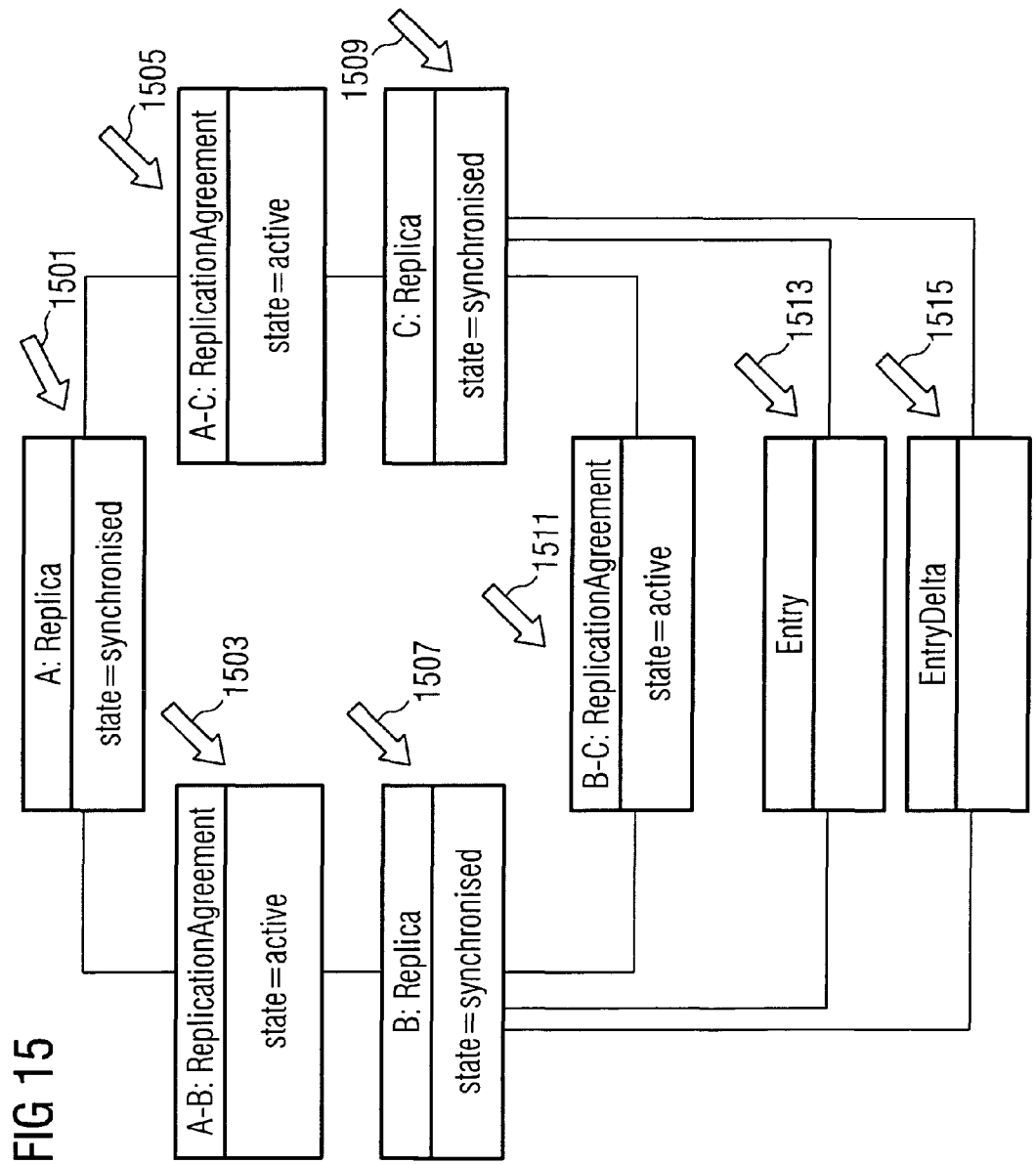
FIG. 15 illustrates a scenario requiring synchronization because of synchronized replicas, according to an embodiment of the invention.

FIGS. 13-15 illustrate two examples that require synchronization, according to an embodiment of the invention.

FIG. 13 illustrates a scenario requiring synchronization because of an inactive replication agreement, according to an embodiment of the invention. In FIG. 13, a replica 1307 and a replica 1309 have lost communications with each other, but both are still in communications with a replica 1301. As a result, just B-C replication agreement 1311 is inactive. The Replica 1301 has a copy of all updates; the replica 1307 is missing updates from the replica 1309, and vice-versa.

When the communications link is subsequently restored, recovery synchronization must typically be performed between the replica 1307 and the replica 1309.

FIG. 14 illustrates a scenario requiring synchronization because of an isolated replica, according to an embodiment of the invention. In FIG. 14, a replica 1409 has lost communications with both a replica 1401 and a replica 1407. Assuming the replicas are located at different sites, this typically represents a site communications failure at the site where replica 1409 is located.

As a result, both replication agreements (A-C Replication Agreement 1405 and B-C Replication Agreement 1411) involving the replica 1409 have gone inactive, and the replica 1409 is isolated. There is no problem with the A-B replication agreement 1403, so the replica 1401 and the replica 1407 both have copies of their own and each others updates, and neither has copies of the replica 1409's updates.

When the communications are restored, both inactive agreements (the A-C Replication Agreement 1405 and the B-C Replication Agreement 1411) enter the recovery state, and recovery synchronization will typically be performed for both. In principle these can be performed either sequentially, or in parallel. It is more efficient on the replica 1409 to perform both synchronizations in parallel, so that the whole can be performed in a single pass, according to an embodiment of the invention.

FIG. 15 illustrates a scenario requiring synchronization because of synchronized replicas, according to an embodiment of the invention. In the FIG. 15, all three replicas 1501, 1507 and 1509 are synchronized, and the replication agreements 1503, 1505, and 1511 are active. However there is an EntryDelta 1515 at the replicas 1507 and 1509 that has not been successfully copied to the replica 1501, and therefore the associated Entry 1513 is only synchronized at the replica 1507 and the replica 1509. This failure may have resulted from a temporary communications glitch, or possibly because of an irreconcilable difference encountered during recovery processing.

In this state, any new EntryDelta 1515 for the Entry 1513 instance received at the replicas 1507 or 1509 is typically copied between the replicas 1507, 1509. Likewise a new EntryDelta 1515 for the Entry 1513 instance received at the replica 1501 is not typically copied to either the replica 1507 or the replica 1509. Entry synchronization is typically required to resolve this discrepancy, according to an embodiment of the invention.

Recovery Synchronization

Recovery synchronization is the processing performed when a replication agreement is in the recovery state. Put simply, synchronization is just a case of copying and applying the missing IRIs 102. Indeed, this is true for Transactions 105 which are "guaranteed" to be unique.

The difficulties arise with the Entry 104 and EntryDelta 103 IRIs, since there may be associations between them that may be incompatible if they are created independently on two or more replicas.

In the case of Entry 104, and in particular DSEs 106, there is the requirement for the rdn and parent combination to be unique. Likewise in the case of EntryDelta 103, there is the requirement for the entry and sequence pair to be unique.

According to an embodiment of the invention, the synchronization process for EntryDelta 103 can be modeled in two ways, putting to one side, for now, any incompatibility resolution. The first option is, as previously described, to copy the missing EntryDelta 103s. The second option is to create new EntryDeltas 103 on the replicas that are missing copies, and which have the same effect on the user information, but allow traceability of the different updates that have actually been applied to the replicas. So, for example, a number of EntryDeltas 103 on a replica (such as the replica 1501 shown in FIG. 15), created during a period of communications outage, might cause the creation of a single EntryDelta 103 on another replica (such as the replica 1507 shown in FIG. 15) as part of the synchronization process. Given that the EntryDeltas 103 include the "synchronized" attribute which lists the replicas to which it was successfully copied, the second option also means that this attribute does not have to be updated during synchronization.

EntryDeltas created by the synchronization processing are typically subject to a number of rules which must be satisfied to ensure the EntryDelta is valid. Clearly, synchronization typically requires valid EntryDeltas, but as noted above, there may be combinations of independent EntryDeltas that cannot be simplistically combined without the resulting EntryDelta being invalid. In other words, the original EntryDeltas are incompatible. In such cases, additional merge rules, discussed below, may be employed to adjust the synchronization EntryDeltas to make them valid, according to an embodiment of the invention.

An extensible mechanism can also be provided whereby the full set of EntryDeltas 103 associated with an Entry 104 can be forwarded to an external system, which can apply application-specific rules to derive the merged EntryDeltas.

Care should be taken with the use of derived EntryDeltas 103 in that it means that the updates applied on a particular replica across multiple Entry 104 instances may actually be applied in a different order during the synchronization. If there are dependencies between Entry 104 instances, for example if referential integrity is supported, these dependencies may be broken.

Synchronization Server

In some embodiments, the RIB 100 may have a synchronization server, which is a replica which is only updated when all replicas are in communications. Thus, the server would just contain the IRIs 102 that are known to have been successfully copied to all replicas. However, this embodiment is somewhat idealized, and other, more practical configurations may be employed as well.

When synchronization is required following a communications outage, the EntryDeltas 103 are applied to the synchronization server in strict time order, so that, for example, referential integrity can be preserved. There are two possibilities if an update cannot be applied without breaking a rule, namely, the update is not applied, or it is applied even though it breaks the rules. A combination of these may be required, depending on individual circumstances. Either way, logging should be used to record the details of "rolled back" EntryDeltas 103 that were previously accepted, or Entry 104 instances that now violate certain rules. Note that rolling back EntryDeltas 103 may have secondary or incidental effects on later EntryDeltas.

Synchronization Server Approximation

For many deployments a dedicated synchronization server may not be feasible, so an approximation to such processing may be performed instead. Consider two replicas, each with a set of independent EntryDeltas 103, which need to be synchronized. Processing could take one of the replicas back to the point of partition, then replay both its EntryDeltas 103, and those of the other replica—in other words, processing that effectively makes a temporary synchronization server. However, this approach would effectively mean the temporary loss of the EntryDeltas 103 on that replica, which is unlikely to be acceptable.

An alternative is to move the time of partition forward, until it catches up with current time, with a synchronization "transaction" that contains the RIB 100 as though it were the synchronization server. As soon as possible, updates made within the transaction are committed and made visible outside the transaction. The purpose of this is to minimize the number of uncommitted updates, since otherwise memory or other resource usage may be unsustainable. An Entry 104 can typically be committed as soon as there are no later associated EntryDeltas 103 in the local replica which have not yet been applied as part of the synchronization processing.

This alternative approach in detail:
  The partition time is time of creation of the oldest EntryDelta 103 which is not common to both replicas.
  A "transaction" is running on both replicas, which aims to shuffle the partition time forward until it catches up with current time.
  The synchronization transaction may contain uncommitted Entry 104 instances. These have had some EntryDelta 103 instances applied, but as described below, cannot yet be committed to the RIB 100, because there are more local EntryDeltas 103 to apply.
  Committing to the RIB 100 means applying the merged EntryDelta 103 and making the result visible to external users.
  Uncommitted Entry 104 instances should be used if referenced during validation of EntryDeltas, in preference to the version in the RIB 100. If there is no such uncommitted version, the current committed version of that referenced Entry 104 is "rolled back" to its state at the time of the EntryDelta 103 being validated, according to an embodiment of the invention.
  The oldest EntryDelta 103 is identified, and is added to the replica that doesn't have it, according to an embodiment of the invention. For example, assume that replica B has the oldest EntryDelta 103, which must be copied to replica A.
  There may already be an uncommitted version of the Entry 104 within the scope of the synchronization transaction on replica A, in which case the EntryDelta 103 can be applied to it, and it should be left uncommitted from the RIB 100
  If there is no uncommitted version and the Entry 104 is not synchronized with replica B, there must typically be at least one later EntryDelta 103 on replica A. Rollback all such EntryDeltas, and then apply the oldest EntryDelta 103, but again do not commit to the RIB 100.
  If there is no uncommitted version and the Entry 104 is synchronized with replica B, the oldest EntryDelta 103 can be applied, the derived EntryDelta 103 created, and the result immediately committed to the RIB 100
  On replica B, this same oldest EntryDelta 103 must typically be applied if there is an uncommitted version of the Entry 104 within the scope of the transaction. If so, and there are no further local EntryDeltas, the derived EntryDelta 103 and Entry 104 can be immediately committed to the RIB 100.
  Repeat the above for the next oldest EntryDelta 103.

The above description assumes everything is successful, but as previously discussed, it may be necessary, as a result of validation to not apply a change, even if has been previously applied successfully. In this case, the result is a change to the RIB 100, and should be represented by a new EntryDelta 103.

Entry Synchronization

The entry synchronization case is effectively no different than the recovery of partition replicas, except that the subset of Entry 104 and EntryDeltas 103 involved is selected differently, in particular from a single Entry 104 which is known to be not identical on all replicas.

Entry 104 synchronization should be attempted as soon as a discrepancy is identified—either as a result of a replication problem or as a result of a background check.

Population of New Replica

The population of a new replica involves copying the IRIs 102 from a live replica. This will typically take a period of time, during which there will be a number of updates to the RIB 100.

First copy all Entry 104 IRIs, then copy and apply all EntryDelta 103 IRIs, starting at the time at which the first Entry IRI 102 was copied. Allow for the fact that some of the EntryDeltas 103 have already been applied.

Once most of the EntryDeltas 103 have been applied, it is possible to switch over to take part in normal replication, possibly performing entry synchronization to cover the switchover period.

Delta Path Selection

Figure 16:
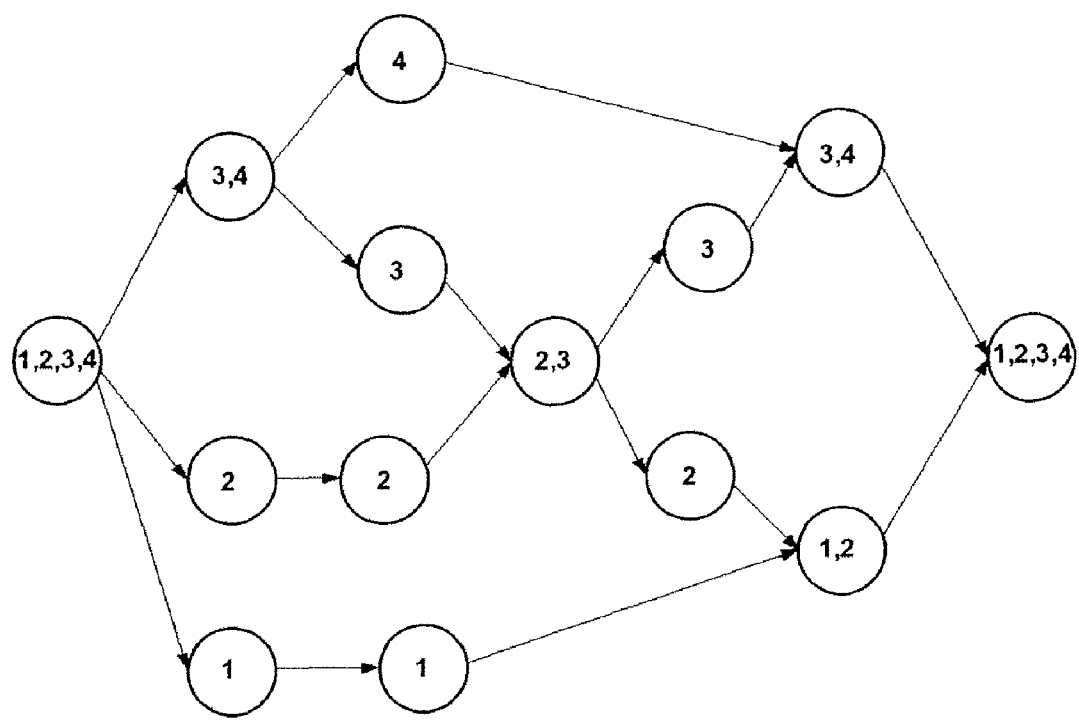
FIG. 16 illustrates a number of versions held by different replicas of an Entry 104 as nodes in a directed graph, according to an embodiment of the invention.

In complex (and rare) cases, the set of EntryDeltas 103 can be merged in more than one way. FIG. 16 illustrates a number of versions of an Entry 104 as nodes in a directed graph, according to an embodiment of the invention. The edges of the graph represent the EntryDeltas 103 that have been applied, and the numbers within the nodes represent the replicas at which that version of the Entry 104 is synchronized. Where there are multiple in-arrows, the Entry 104 version has been created as a result of a synchronization merge.

Now consider the final merge, on the right hand side. At this point we have two versions of the entry—that held at replicas 1 and 2, and that held at replicas 3 and 4. There is no need for all combinations of replicas to perform the merge—only one of 1 and 2, and one of 3 and 4, need be involved. Of the possible pairs of replicas, the best is 2 and 3, since the point of divergence is significantly "closer" than any of the other possibilities (1 and 3, 1 and 4, 2 and 4). Thus, before the synchronization process starts, the replicas negotiate to identify which pairs need to be involved in the synchronization.

General Merge Rules

In order to merge a set of EntryDeltas 103 for a given Entry 104, a number of rules will likely be required depending on any constraints that might be applied to the Entry 104 instances.

The following rules may be used:
Later EntryDeltas 103 will override earlier EntryDeltas 103
client precedence may override the time-based rule
extensible rules may override the previous two rules.

As briefly mentioned earlier, extensible rules will typically be offered by sending a notification to some external system containing the set of EntryDeltas 103 to be merged. The external system (for example an application server) may respond with the merge EntryDeltas 103 to be applied.

X.500 Merge Rules

In addition to the general merge rules, there are specific rules to be applied to DseDeltas 107 to ensure that the X.500 rules are not breached. As a minimum, rules will typically be required for the following:
   Add Entry 104—entry already exists (same structural object class and different structural object class)
   Delete Entry 104—entry does not exist
   Delete Entry 104—non-leaf
   Remove value—value not present
   Remove attribute—attribute not present
   Add attribute—attribute already exists
   Add value—value already exists
   It is also possible to specify specific merge rules on an object class and attribute type basis.

Other Considerations

RIB 100 User Quality of Service (QoS)

The quality of service offered by the RIB 100 is typically dependent, amongst other things, on how well synchronized are the replicas. A fully synchronized RIB 100 is clearly better quality data than a partitioned RIB 100. A RIB 100 user may choose (or be allowed) to use data only, for example, from synchronized replicas. Clients could be automatically disconnected if the QoS is below their requirements, which might be indicated either via different ports, or user configuration data. Similar configuration might also be applied on the schema side—only access to particular attributes of particular object classes are relevant to QoS considerations.

Reconciliation

Reconciliation is the background detection of unsynchronized UserInfo instances which were considered to be synchronized. The instances can be marked as unsynchronized, but any automated attempts to synchronize the instances will typically involve creation of new UserInfoDeltas, since all previous UserInfoDeltas have typically been marked as copied to all replicas.

Asynchronous Replication

The default replication mode, as previously described, is that of synchronous replication, i.e., the update is typically only committed once all replicas have applied the update. Likewise the response back to the client is not made until all replicas have committed the update.

As an alternative, it would be possible to offer asynchronous replication for a subset of the ReplicationAgreements. The mechanisms would be similar except that if the ReplicationAgreement is marked as asynchronous, responses from that replica would not be expected immediately, and would block neither the committing of the update at the synchronous replicas, nor the response back to the client.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention. For example, processes, functions, and operations described as being carried out in software may be carried out by hardware, such as dedicated hardware for the specific function. Functionality described as methods, may, for example, be implemented as a module, such as a dedicated hardware module. In general, the terms used herein should not be construed to limit the invention to the specific embodiments disclosed in the specification, but should be construed to include all systems and methods that operate under the spirit of the invention described and in any claims that may eventually be set forth. Thus, it is intended that the invention covers the modifications and variations of this invention provided they come within the scope of any claims to be associated with this invention and their equivalents.

The invention claimed is:

1. A system for real-time data management of a network data repository in a peer-to-peer computing network, comprising:
   a first replica of a plurality of replicas, hosted in a first server computer, the first replica configured to:
      accept data updates to replica entries on the first replica, each replica entry corresponding to an entry in the network data repository,
      update replica entries on the first replica to include the accepted data updates,
      determine states for replication agreements between the first replica and replicas of the plurality of replicas having corresponding replica entries to entries in the network data repository, wherein the first replica has a replication agreement with each replica of the plurality of replicas, each replication agreement pertaining to coordination of replica entries between replicas party to the agreement,
      determine if an updated replica entry on the first replica violates a replication agreement, wherein violation of the replication agreement indicates that an accepted data update on the first replica failed to be copied to another replica party to the replication agreement, and
      replicate accepted data updates to other replicas of the plurality of replicas for replication agreements having an active state and not violated for the accepted data update; and
   a second replica of the plurality of replicas, hosted in a second server computer, the second replica configured to:
      accept data updates to replica entries on the second replica, each replica entry corresponding to an entry in the network data repository, update the replica entries on the second replica to include the accepted data updates, determine states for replication agreements between the second replica and replicas of the plurality of replicas having corresponding replica entries to entries in the network data repository, wherein the second replica has a replication agreement with each replica of the plurality of replicas, each replication agreement pertaining to coordination of replica entries between replicas party to the agreement, determine if an updated replica entry on the second replica violates a replication agreement, wherein violation of the replication agreement indicates that an accepted data update on the second replica failed to be copied to another replica party to the replication agreement, and replicate accepted data updates to other replicas of the plurality of replicas for replication agreements having an active state and not violated for the accepted data update.

2. The system of claim 1 further comprising:

a third replica of the plurality of replicas, hosted in the first server computer, the second replica configured to:

accept data updates to replica entries on the third replica, each replica entry corresponding to an entry in the network data repository, update the replica entries on the third replica to include the accepted data updates, determine states for replication agreements between the third replica and replicas of the plurality of replicas having corresponding replica entries to entries in the network data repository, wherein the third replica has a replication agreement with each replica of the plurality of replicas, each replication agreement pertaining to coordination of replica entries between replicas party to the agreement, determine if an updated replica entry on the third replica violates a replication agreement, wherein violation of the replication agreement indicates that an accepted data update on the third replica failed to be copied to another replica party to the replication agreement, and replicate accepted data updates to other replicas of the plurality of replicas for replication agreements having an active state and not violated for the accepted data update.

3. The system of claim 1 wherein the first replica is further configured to:

synchronize replica entries on the first replica with replica entries on other replicas of the plurality of replicas having replication agreements violated by accepted data updates on the first replica because the accepted data updates could not be copied to the other replicas of the plurality of replicas.

4. The system of claim 3 wherein the first replica is further configured to apply a merge rule in negotiations to determine an optimum agreed content of entries, the replica entries of which have been subject to independent and incompatible updates.

5. The system of claim 4 wherein the merge rule that the first replica is configured to apply comprises at least one of (overriding earlier data changes for replica entries with later data changes for the replica entries and applying a client precedence order over a time-based precedence).

6. The system of claim 1 wherein the first replica is further configured to:

determine that a replication agreement between the first replica and the second replica has changed to an active state; and synchronize the replica entries on the first replica with the replica entries on the second replica to incorporate data updates to replicas on the first replica and the second replica not updated when the replication agreement between the first replica and the second replica was not active.

7. The system of claim 1 wherein the first replica is further configured to:

determine that a plurality of replication agreements between the first replica and a plurality of other replicas have changed to active states, negotiate with the plurality of other replicas to determine a minimum number of additional data updates needed on the first replica and the plurality of other replicas in order to synchronize the replica entries on the first replica with the replicas entries on the plurality of other replicas to incorporate data updates to replica entries on the plurality of replicas when the plurality of replication agreements were inactive.

8. The system of claim 7 wherein the plurality of replicas are further configured to apply a merge rule in negotiations to determine an optimum agreed content of entries, the replica entries of which have been subject to independent and incompatible updates.

9. The system of claim 8 wherein the merge rule that the plurality of replicas are configured to apply comprises at least one of (overriding earlier data changes for replica entries with later data changes for the replica entries and applying a client precedence order over a time-based precedence).

10. The system of claim 7, further comprising:

a quality of service module configured to suspend the ability of a replica of the plurality of replicas to respond to data queries regarding the network data repository for a client when the replica falls below a synchronization quality of service threshold set by or on behalf of the client.

11. The system of claim 1, wherein the first replica further comprises:

a first replicated information base configured to contain a plurality of replica entries such that each replica entry corresponds to an entry in the network data repository;

a first transaction module configured to receive data updates to replica entries in the first replicated information base;

a first add-delta module configured to create a first entry delta for a first replica entry of the plurality of replica entries in the first replicated information base and provide the first entry delta with a received data update from the transaction module and configured to create a copy of the received data update for a second replica entry in the second replica of the plurality of replicas;

a first lock module configured to lock the first replica entry in the first replicated information base;

a first delta-OK module configured to validate that the first entry delta has compatible characteristics with the first replica entry, wherein the first add-delta module is further configured to transmit the copy of the received data update across the network to the second replica having the second replica entry after the first delta-OK module has validated the first entry delta;

a commit module configured to request application of entry deltas after receiving success indicators from locking modules associated with a change to an entry in the network data repository;

a first application module configured to apply the first entry delta to the first replica entry in the first replicated information base, such that requests for the entry in the first replica will henceforth provide the received data update, the first application module configured to apply the first entry delta after receiving a request from the commit module; and a first unlock module configured to unlock the first replica entry after the first application module has applied the first entry delta to the first replica entry.

12. The system of claim 11, wherein the second replica further comprises:

a second replicated information base configured to contain a plurality of replica entries such that each replica entry corresponds to an entry in the network data repository;

a second add-delta module configured to receive the data update from the first add-delta module and create a second entry delta on the second replica entry;

a second lock module configured to lock the second replica entry in the second replicated information for the second entry delta and transmit a success indicator to the first replica after locking the second replica entry;

a second application module configured to apply the second entry delta to the second replica entry, such that requests for the entry in the second replica will henceforth provide the received data update, the second application module configured to apply the first entry delta after receiving a request from the commit module; and a second unlock module configured to unlock the second replica entry after applying the second entry delta to the second replica entry.

13. The system of claim 11 wherein the first replica further comprises:

a communications module configured to determine whether a replication agreement between a replica and another replica of the plurality of replicas has become inactive due to a loss of communications between the first replica and the other replica, the communications module further configured to determine that communications have been restored between the first replica and another replica; and a synchronization module configured to request updated data for entries in the first replica that changed during the inactive state, the synchronization module further configured to control updating of another replica to resolve violations of the replication agreement until the replication agreement is restored to active status.

14. The system of claim 11, the first replica further comprising:

a first queuing module configured to queue requests to the first lock module when the first lock module has already locked the first replica entry in the first replicated information base; and a priority module configured to determine that a second received entry delta has priority over a first received entry delta while processing of the first received entry delta is incomplete and further configured to instruct the first unlocking module to unlock the first data replica and further configured to queue the first received entry delta on the first queuing module until processing has been completed for the second received entry delta.

15. The system of claim 14, wherein the priority module is further configured to identify a first priority number for the first received entry delta and identify a second priority number for the second received entry delta and further configured to determine that the second priority number has priority over the first priority number.

16. The system of claim 14, wherein the priority module is further configured to identify a first priority number associated with a first external user associated with the first received entry delta and configured to identify a second priority number associated with a second external user associated with the second received entry delta and determine that the second priority number has priority over the first priority number.

17. The system of claim 11, the first replica further comprising:

a first queuing module configured to queue requests to the first lock module when the first lock module has already locked the first replica entry in the first replicated information base.

18. The system of claim 11 wherein the transaction module is further configured to received a transaction request from an external user to update the first replica entry to include the received data change, wherein the transaction module is further configured to engage the first add-delta module to create the first entry delta after receiving the transaction request.

19. The system of claim 11 wherein the first transaction module is further configured to inform the external user that the transaction request has been successfully validated after the success indicator has been received by the first replica and further configured to receive a request from the external user to commit the data change to the first replica entry and the second replica entry.

20. The system of claim 11 wherein the transaction module is further configured to inform the external user that the data change has been successful applied to the network data repository after unlocking the first replica entry and after unlocking the second replica entry.

21. A system for managing data in a network data repository deployed across a plurality of servers, comprising:

a first replica configured for communications with other replicas of the plurality of replicas, the first replica, hosted on a server of the plurality of servers, further comprising:

a first replicated information base configured to contain at least a portion of the network data repository, the first replicated information base comprising a plurality of replica entries such that each replica entry corresponds to an entry in the network data repository, the first replicated information base further comprising a plurality of replication agreements between each replica and other replicas of the plurality of replicas;

a state determination module configured to determine whether a replication agreement between a replica of the plurality of replicas and another replica of the plurality of replicas is in an inactive state due to a loss of communications, the state determination module further configured to determine that communications have been restored between the first replica and another replica; and a synchronization module configured to request updated data for entries in a replica of the plurality of replicas that changed during the inactive state of the replication agreement, the synchronization module further configured to control updating of another replica of the plurality of replicas to resolve the resulting violations of the replication agreement until the replication agreement is restored to active status.

22. The system of claim 21 wherein the synchronization module is configured to operate with a synchronization server, the synchronization server configured to obtain a composite replica entry common between the first replica entry and a second replica entry having an inactive replication agreement, apply to the composite replica entry valid updates to the first replica entry not found in the second replica entry to create a first updated replica entry, apply to the first updated replica entry valid changes to the second replica entry not found in the first replica entry to create a second updated replica entry and transmit the second updated replica entry to the first replicated information base.

23. The system of claim 21 wherein synchronization module is configured to obtain from the state determination module a last time in which the first replica entry was synchronized with a second replica entry, where the replication agreement between the first replica entry and the second replica entry has become inactive, suspend the first replica entry from further updates, return processing time back in the first replica to the determined last time that the first replica entry was synchronized with the second replica entry, process all data updates between the first replica entry and the second replica entry that were missed when the first replication agreement was inactive, and restore the first replica entry to accept further updates.

24. A method for real-time data management of a network data repository in a peer-to-peer computing network, comprising:
  accepting a data update to an entry of the network data repository in a first replica of a plurality of replicas, the first replica hosted on a first server of a plurality of servers, the first replica containing at least a portion of the network data repository as a plurality of replica entries that correspond to entries in the network data repository;
  identifying a replica entry of the plurality of replica entries on the first replica that corresponds to the entry;
  reviewing replication agreements between the first replica and other replicas of the plurality of replicas, wherein each replication agreement describes a relationship between the first replica and another replica of the plurality of replicas;
  determining a state of a first replication agreement between the first replica and a second replica of the plurality of replicas, the second replica hosted on a second server of the plurality of servers;
  updating the identified replica entry on the first replica; and
  replicating the accepted data update on the second replica if the first replication agreement is in an active state and if the accepted data update could be copied to the second replica.

25. The method of claim 24, further comprising:
  replicating another data update to another replica entry in the first replica from a third replica of the plurality of replicas, wherein the first replica and the third replica have a replication agreement in an active state and wherein the another data update has been copied from the third replica to the first replica.

26. The method of claim 24, further comprising:
  determining that a plurality of replication agreements between the first replica and a plurality of other replicas have changed to active states,
  negotiating with the plurality of other replicas to determine a minimum number of additional data updates needed between on first replica and on the plurality of other replicas in order to synchronize the replica entries on the first replica with the replica entries on the plurality of other replicas to incorporate data updates to replica entries on the plurality of replicas when the plurality of replication agreements were inactive.

27. The method of claim 26, further comprising applying a merge rule in negotiations to determine the optimum agreed content of entries, the replica entries of which have been subject to independent and incompatible updates.

28. The method of claim 26 wherein the merge rule comprises at least one of (overriding earlier data updates for replica entries with later data updates for the replica entries and applying a client precedence order over a time-based precedence).

29. The method of claim 24, further comprising:
  suspending the ability of a replica of the plurality of replicas to respond to data queries regarding the network data repository for a client when the replica falls below a synchronization quality of service threshold set by or on behalf of the client.

30. The method of claim 24 further comprising:
  determining that a replication agreement pertaining to a third replica and a first replica has become inactive due to a loss of communications between the first replica and a third replica of the plurality of replicas;
  determining that a replication agreement between the third data replica and a second replica has also become inactive due to a loss of communications between the second replica and the third replica;
  determining that communications have been restored between the first replica and the third replica; and
  requesting data updates for the first replica.

31. The method of claim 24, wherein replicating the data update to the second replica comprises:
  creating a copy of the data update for a second replica entry in the second replica, the second replica entry corresponding to the entry in the network data repository;
  creating a first entry delta for the first replica entry, wherein the first entry delta includes the data update;
  locking the entry in the first replica entry on the first replica;
  validating that the first entry delta has compatible characteristics with the entry;
  transmitting the copy of the accepted data update across the network to the second replica;
  creating a second entry delta on the second replica, wherein the second entry delta includes the data update in a format suitable for the second replica entry;
  locking the entry in the second replica entry on the second replica;
  transmitting a success indicator from the second replica to the first replica after locking the entry in the second replica entry;
  applying the first entry delta to the first replica entry and applying the second entry delta to the second replica entry, such that requests for the entry in the first replica and the second replica will henceforth provide the data update;
  unlocking the first replica entry after applying the first entry delta to the first replica entry; and
  unlocking the second replica entry after applying the second entry delta to the second replica entry.

32. The method of claim 30, further comprising:
  receiving a second data update for the entry in the network data repository, the entry corresponding to the second replica entry located on the second replica;
  creating a third entry delta on the second replica entry, wherein the third entry delta includes the second data update;
  locking the entry in the second replica entry on the second replica by the third entry delta;
  receiving a lock request from the second data entry delta;
  unlocking the entry in the second replica entry locked by the third entry delta after applying a locking priority rule that determines that the second entry delta has priority over the third entry delta and queuing the lock by the third entry delta; and re-locking the entry in the second data replica for the third entry delta after unlocking the second replica entry after applying the second entry delta to the second replica entry.

33. The method of claim 32, wherein applying the locking priority rule comprises:

identifying a first priority number for the first replica that created the second data replica, the priority number associated with the first replica;

identifying a second priority number for the third data replica, the priority number associated with the second replica; and determining that the first priority number has a higher priority than the second priority number, wherein the determination indicates that the lock applied by the third data replica will be released in favor of the lock for the second data replica.

34. The method of claim 32 wherein applying the locking priority rule comprises:

identifying a first priority number associated with a first external user associated with the first data replica;

identifying a second priority number associated with a second external user associated with the third data replica; and determining that the first priority number has a higher priority than the second priority number, wherein the determination indicates that the lock applied by the third data replica will be released in favor of the lock for the second data replica.

35. The method of claim 30, further comprising:

receiving a second data update for the entry in the network data repository, the entry corresponding to the second replica entry located on the second replica, wherein the second data update is received after the received data update;

creating a third entry delta on the second replica entry, wherein the third entry delta includes the second data update in a format suitable for the second replica entry;

queuing a lock on the entry in the second replica entry on the second replica for the third entry delta after notice of the locked entry in the second replica entry on the second replica due to the second entry delta; and locking the entry in the second data replica for the third entry delta after unlocking the second replica entry after applying the second entry delta to the second replica entry.

36. The method of claim 30, further comprising:

receiving a transaction request from an external user to update the first replica entry to include the received data update, wherein the first entry delta is created after receiving the transaction request.

37. The method of claim 30, further comprising:

informing the external user that the transaction request has been successfully validated after the success indicator has been received by the first replica; and receiving a request from the external user to commit the data update to the first replica entry and the second replica entry.

38. The method of claim 30, further comprising:

informing the external user that the data update has been successfully applied to the network data repository after unlocking the first replica entry and after unlocking the second replica entry.

39. A method for managing data in a network data repository deployed across a plurality of replicas, wherein each entry in the network data repository corresponds to a replica entry in each of the plurality of replicas and wherein each replica maintains a replication agreement with other replicas of the plurality of replicas, the method further comprising:

determining that a first replication agreement related to a first replica and a second replica has entered an inactive state due to a loss of communications between the first replica and the second replica hosting the second replica entry;

determining that a second replication agreement related to the first replica and a third replica has entered an inactive state due to a loss of communications between the first replica and the third replica, wherein communications between the second replica and the third replica have not been interrupted;

determining that communications have been restored between the first replica and the second replica and that communications have been restored between the first replica and the third replica;

restoring the first replication agreement to an active state by synchronizing the first replica and the second replica to each other; and restoring the second replication agreement to an active state by synchronizing the first replica and the third replica to each other.

40. The method of claim 39 wherein synchronizing the first replica and the second replica, comprises:

loading a synchronization replica with a composite replica common between the first replica and the second replica;

applying to the composite replica valid data changes to the first replica not found in the second replica to create a first updated replica;

applying to the first updated replica valid data changes to the second replica not found in the first replica to create a second updated replica; and transmitting the second updated replica to the first replica and to the second replica entry.

41. The method of claim 39 wherein synchronizing the first replica and the second replica, comprises:

determining a last time in which the first replica was synchronized with the second replica;

suspending the first replica and the second replica from further data updates;

returning processing time back to a determined last time that the first replica was synchronized with the second replica;

processing all data updates between the first replica and the second replica that missed when the first replication agreement was inactive; and restoring the first replica and the second replica to accept further updates.

* * * * *